United States Patent [19]

Tobagi et al.

[11] Patent Number: 4,503,533
[45] Date of Patent: Mar. 5, 1985

[54] LOCAL AREA COMMUNICATION NETWORK UTILIZING A ROUND ROBIN ACCESS SCHEME WITH IMPROVED CHANNEL UTILIZATION

[75] Inventors: Fouad A. Tobagi, Los Altos, Calif.; Luigi Fratta, Segrate; Flaminio Borgonovo, Cantù, both of Italy

[73] Assignee: Stanford University, Palo Alto, Calif.

[21] Appl. No.: 294,745

[22] Filed: Aug. 20, 1981

[51] Int. Cl.³ .............................................. H04J 6/00
[52] U.S. Cl. ........................................ 370/85; 370/93; 370/94
[58] Field of Search ........................ 370/85, 94, 93, 95, 370/86, 87, 88, 89; 340/825.05, 825.5

[56] References Cited

U.S. PATENT DOCUMENTS

| | | | |
|---|---|---|---|
| 3,732,374 | 5/1973 | Rocher et al. | 370/85 |
| 3,940,561 | 2/1976 | Heinze et al. | 370/85 |
| 4,210,780 | 7/1980 | Hopkins et al. | 370/85 |
| 4,241,330 | 12/1980 | Hery et al. | 340/825.05 |
| 4,292,623 | 9/1981 | Eswaran et al. | 370/85 |

Primary Examiner—Douglas W. Olms
Attorney, Agent, or Firm—Flehr, Hohbach, Test, Albritton & Herbert

[57] ABSTRACT

Disclosed is a local area communication network based upon a broadcast communication system comprising an inbound channel and an outbound channel, a plurality of stations connected to both the inbound and the outbound channels, transmitting on the outbound channel which utilizes an access protocol where the the access protocol used by the stations connected to the bus is a distributed algorithm and is based upon a conflict-free round robin (RR) access scheme. The time required to switch from one active user to the next in a round is minimized (on the order of carrier detection time, and is independent of the end-to-end network propagation delay. This improvement is particularly significant when the channel data rate is so high, or the end-to-end propagation delay is so large, or the packet size is so small as to render the end-to-end propagation delay a significant fraction of, or larger than, the transmission time of a packet. Moreover, some features of the present invention make it particularly suitable for voice applications. In view of integrating voice and data, a voice/data protocol is described which allows it to meet the bandwidth requirement and maximum packet delay constraint for voice communication at all times, while guaranteeing a minimum bandwidth requirement for data traffic. The voice/data protocol constitutes a highly adaptive allocation scheme of channel bandwidth, which allows data users to steal the bandwidth unused by the voice application.

66 Claims, 20 Drawing Figures

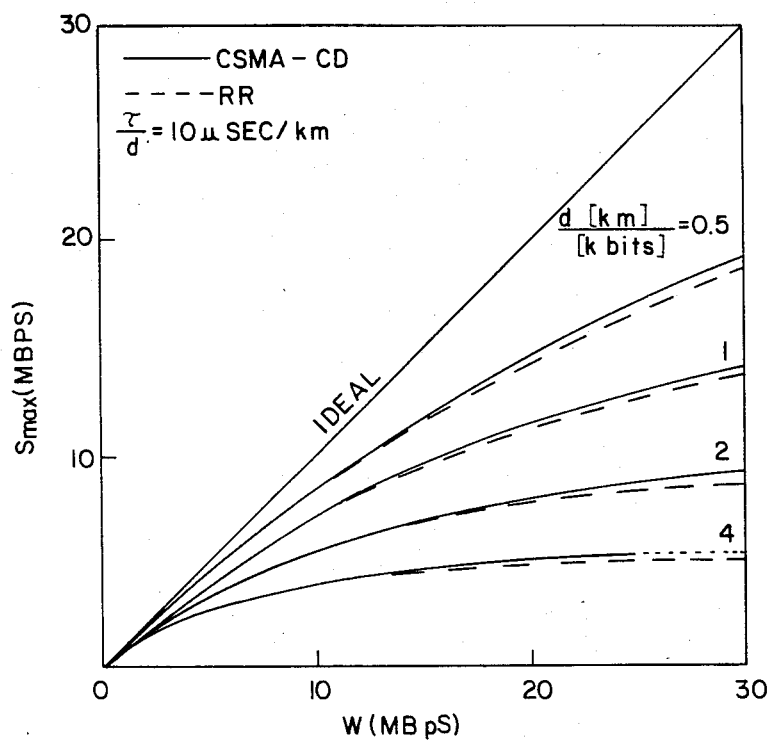
FIG.—1
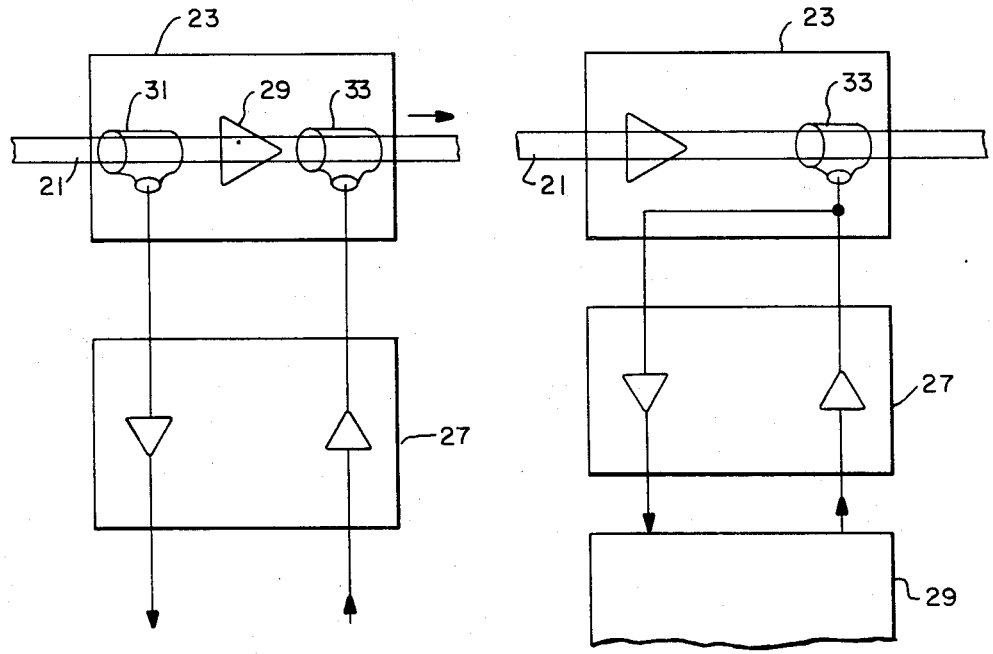
FIG.—2A  FIG.—2B

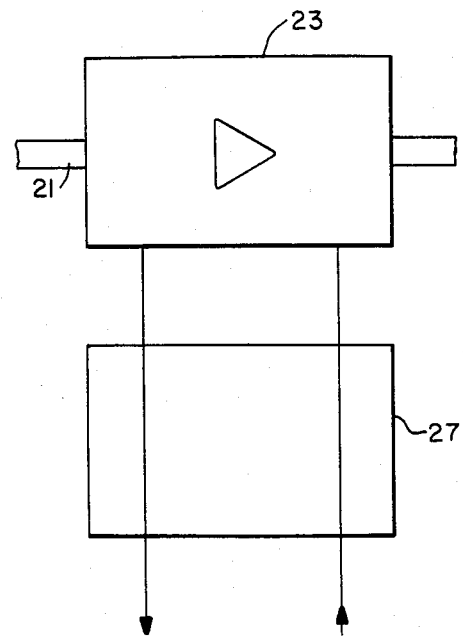
FIG. — 2C
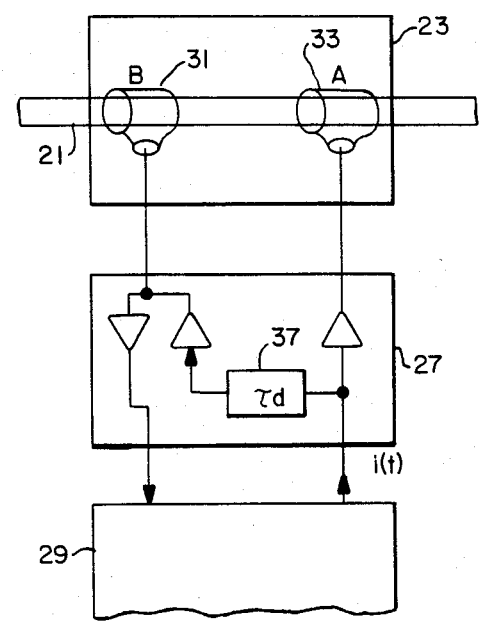
FIG. — 2D
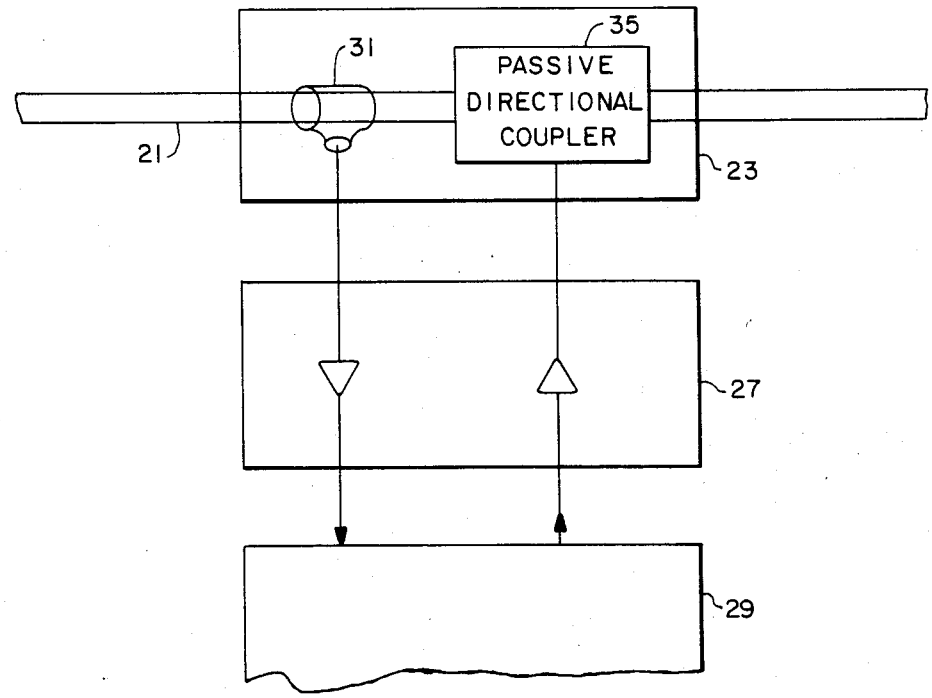
FIG. — 2E

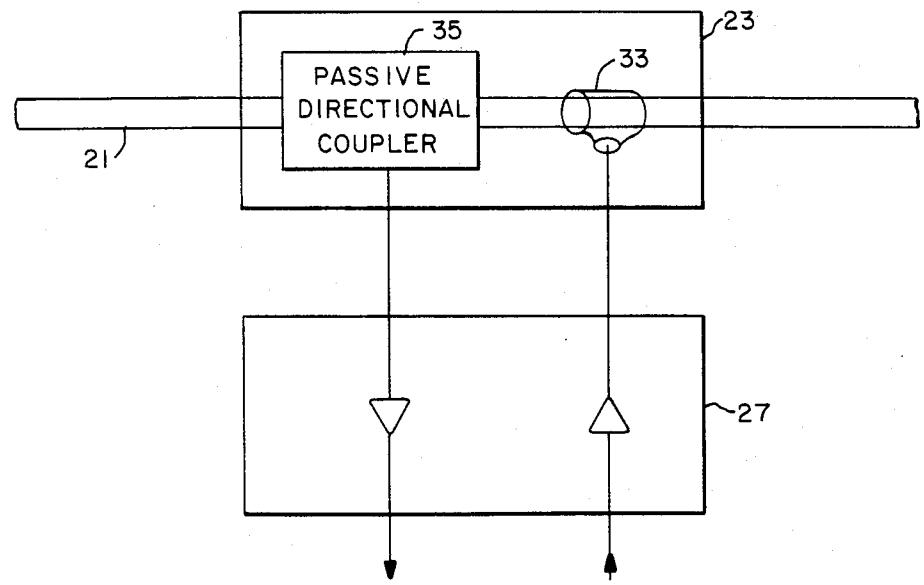
FIG.—2F
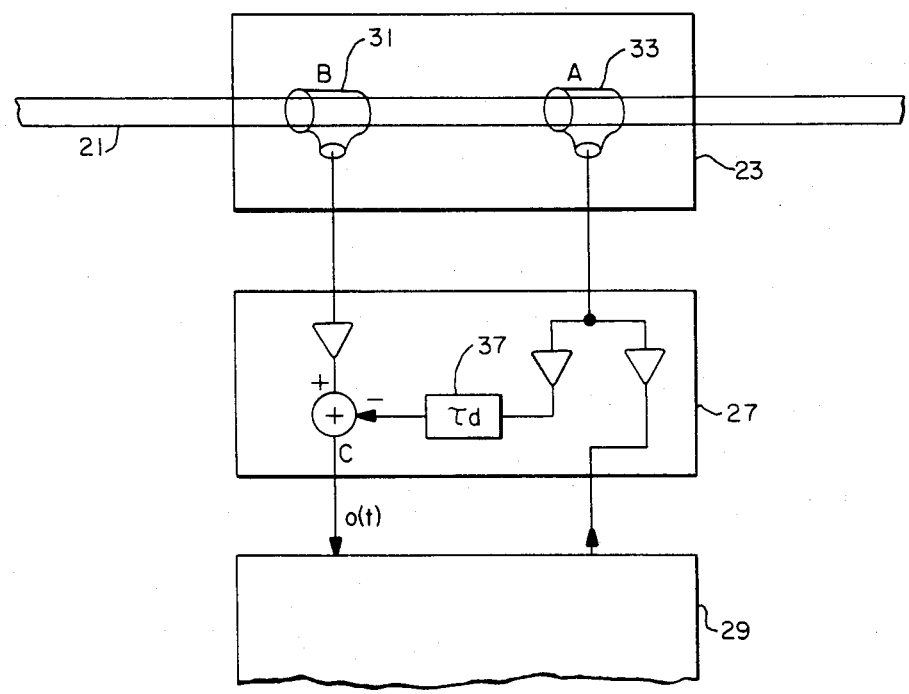
FIG.—2G

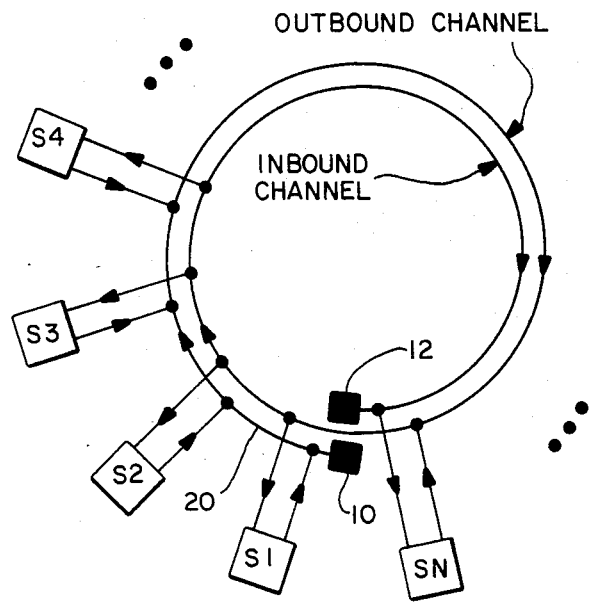
FIG.—3A
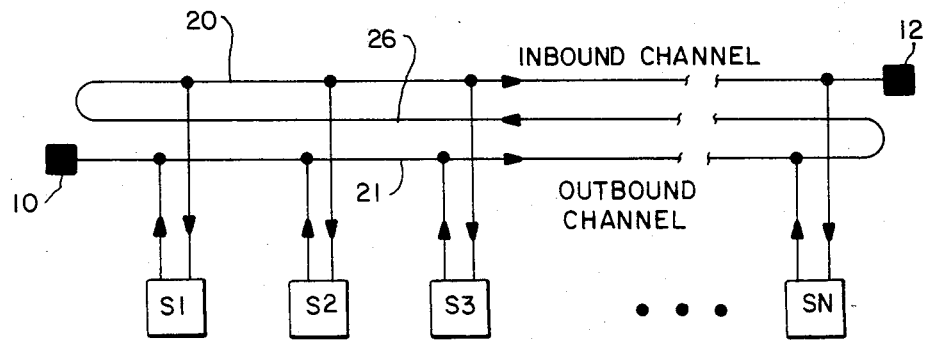
FIG.—3B

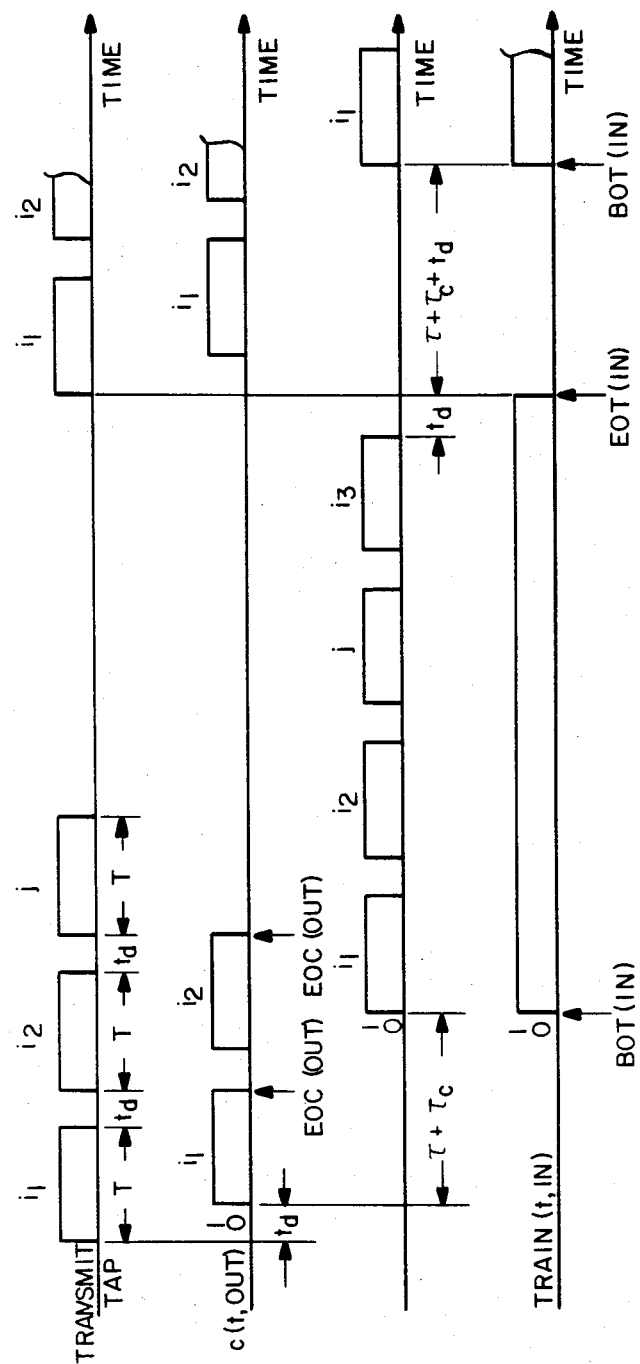
FIG.-4  SIGNALS AND EVENTS AS OBSERVED BY STATION j, ASSUMING THAT STATIONS WITH INDICES $i_1 < i_2 < j < i_3$ ARE NONIDLE.

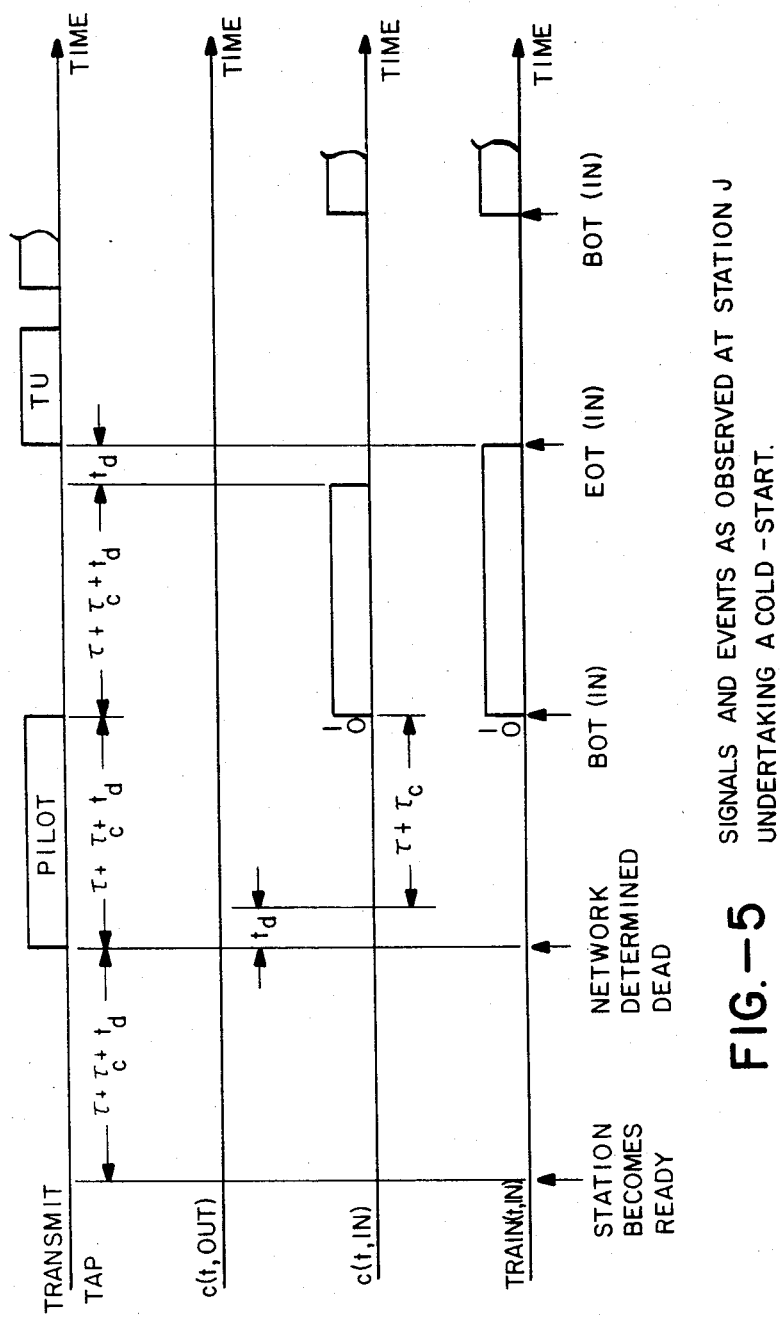
FIG.-5   SIGNALS AND EVENTS AS OBSERVED AT STATION J UNDERTAKING A COLD-START.

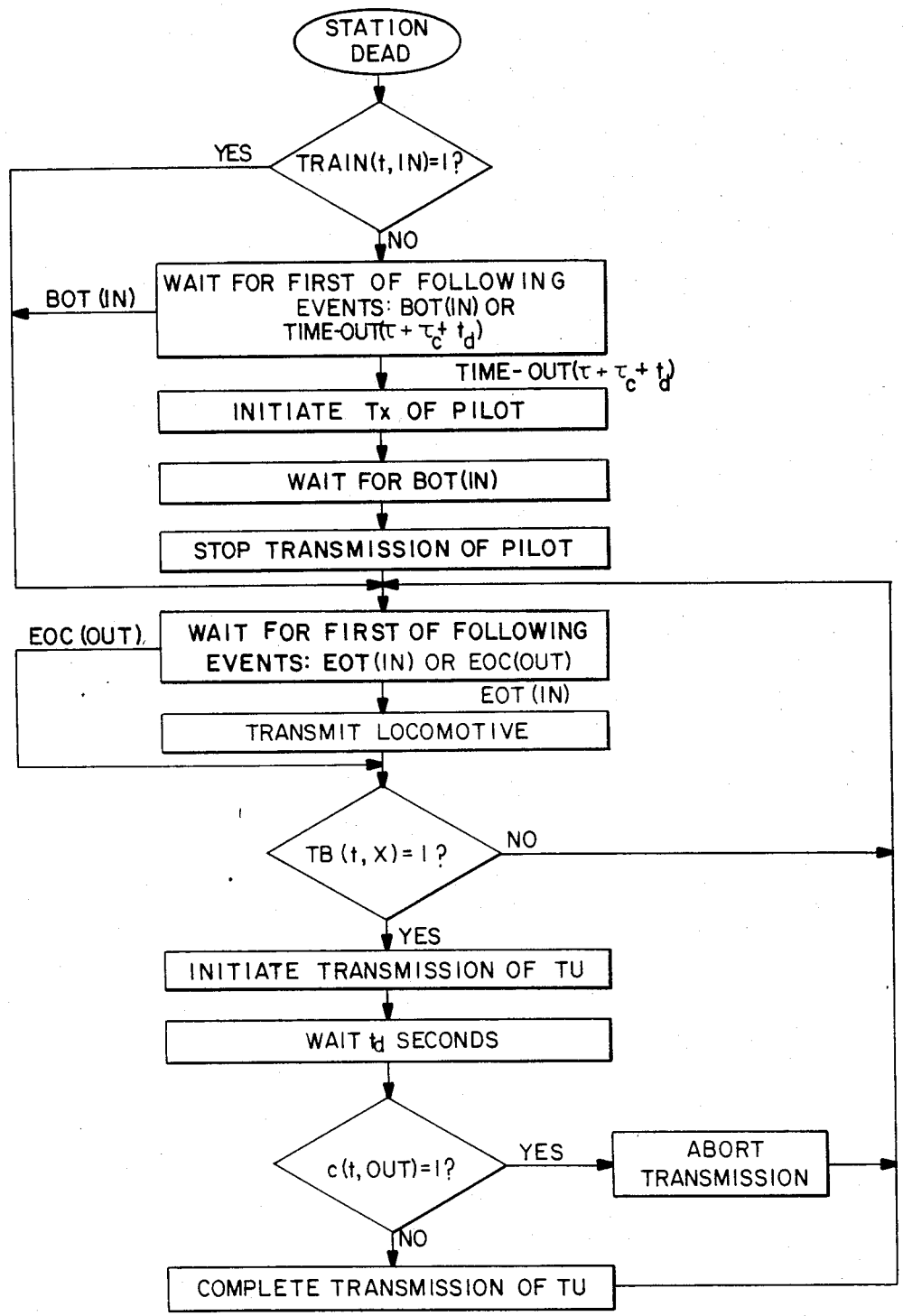
FIG.-6 FLOW CHART FOR THE ACCESS PROTOCOL

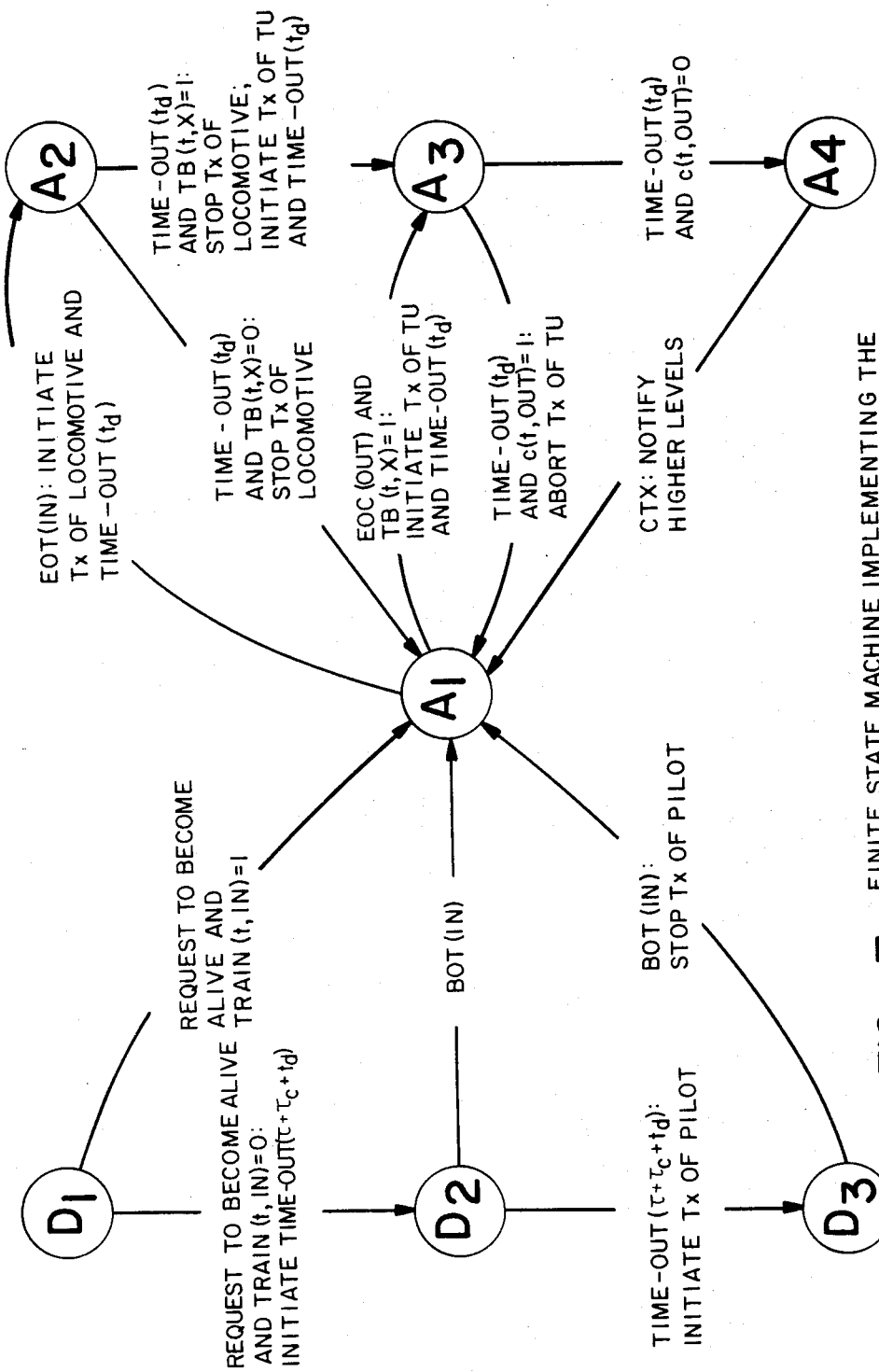
FIG.-7  FINITE STATE MACHINE IMPLEMENTING THE ACCESS PROTOCOL.

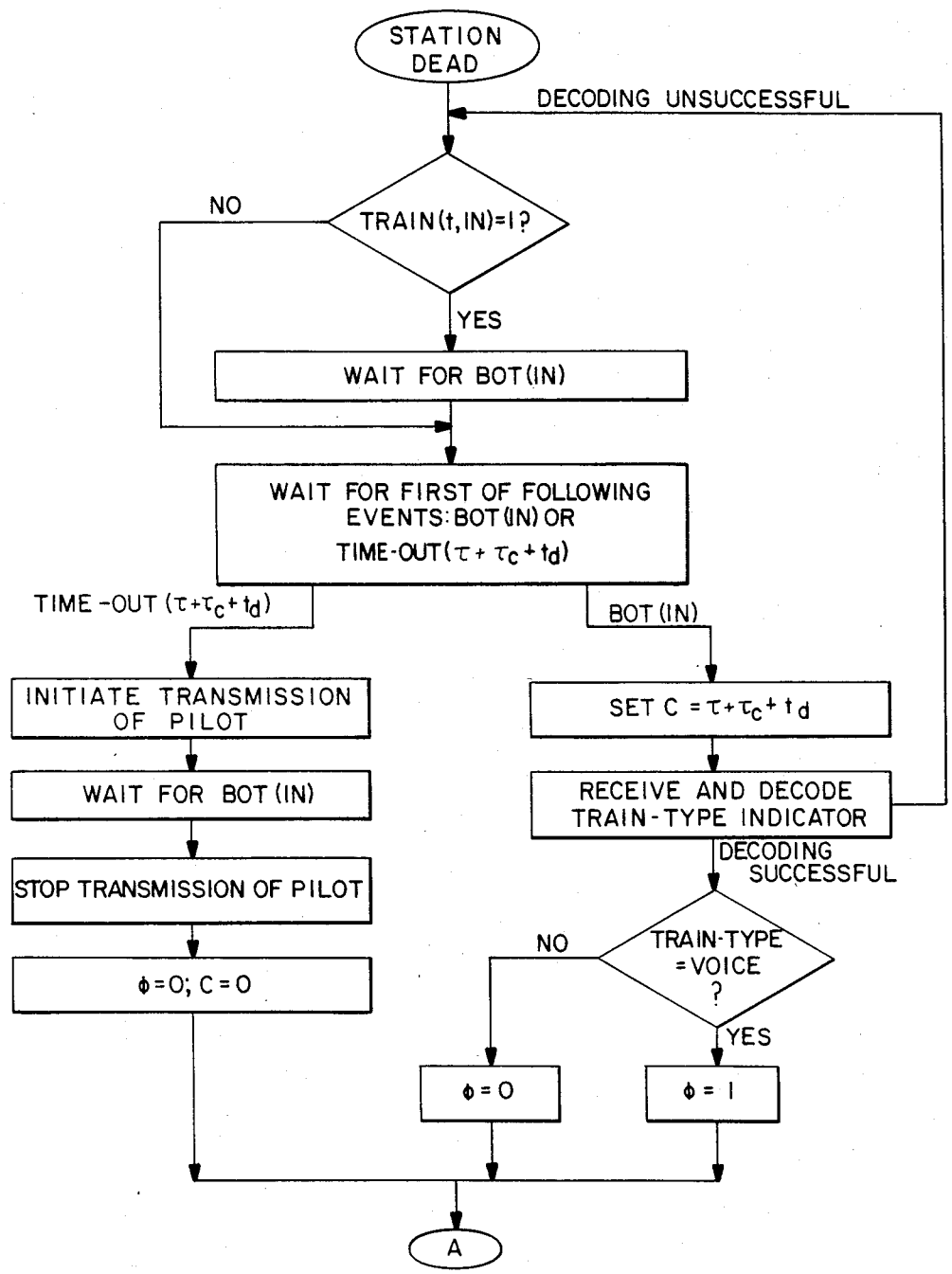
FIG. —8  FLOW CHART FOR THE INITIALIZATION PORTION OF THE VOICE/DATA ALGORITHM.

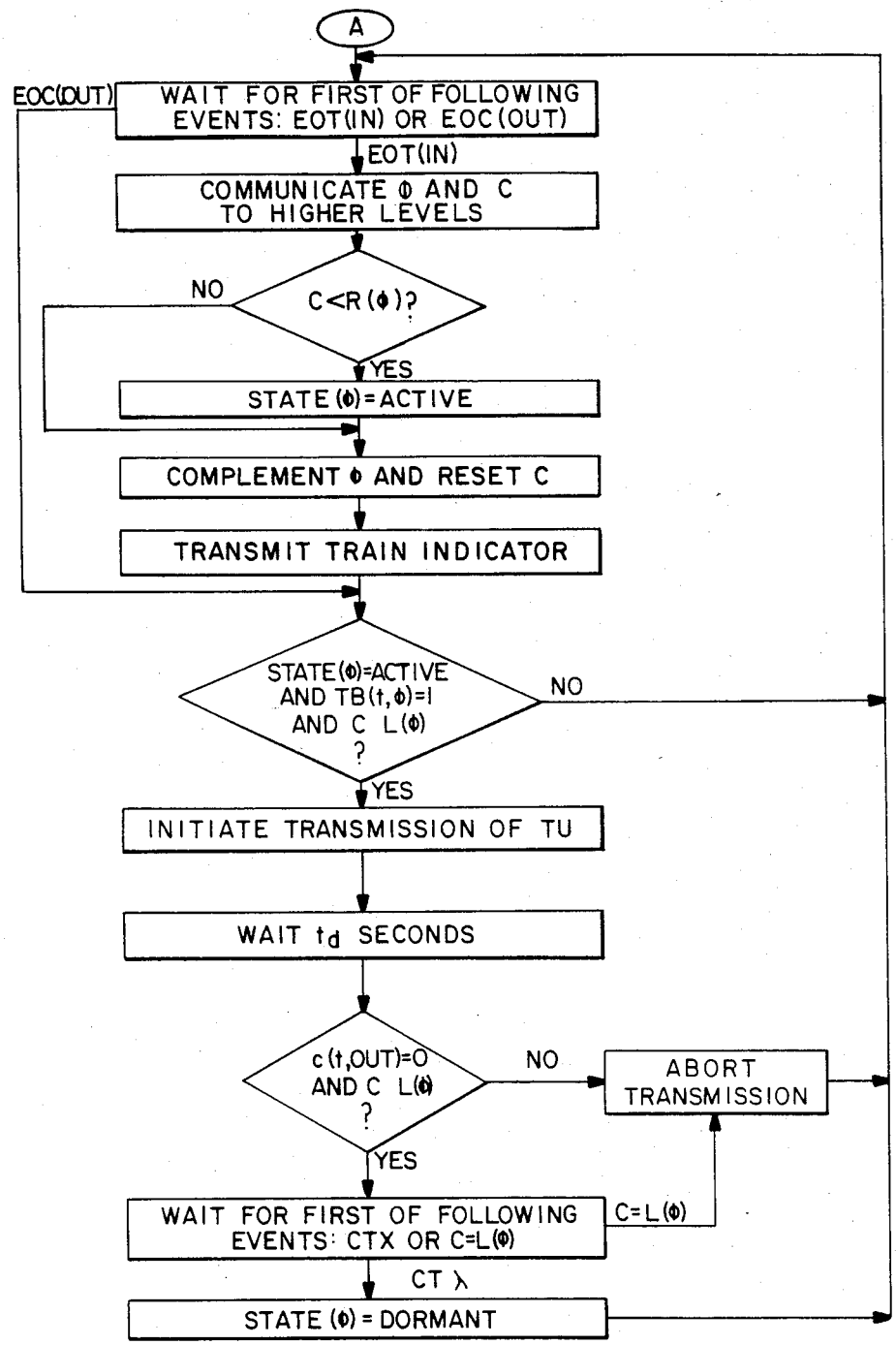
FLOW CHART FOR THE PORTION OF THE VOICE/DATA ALGORITHM EXECUTED BY A STATION IN THE ALIVE STATE.
FIG.—9

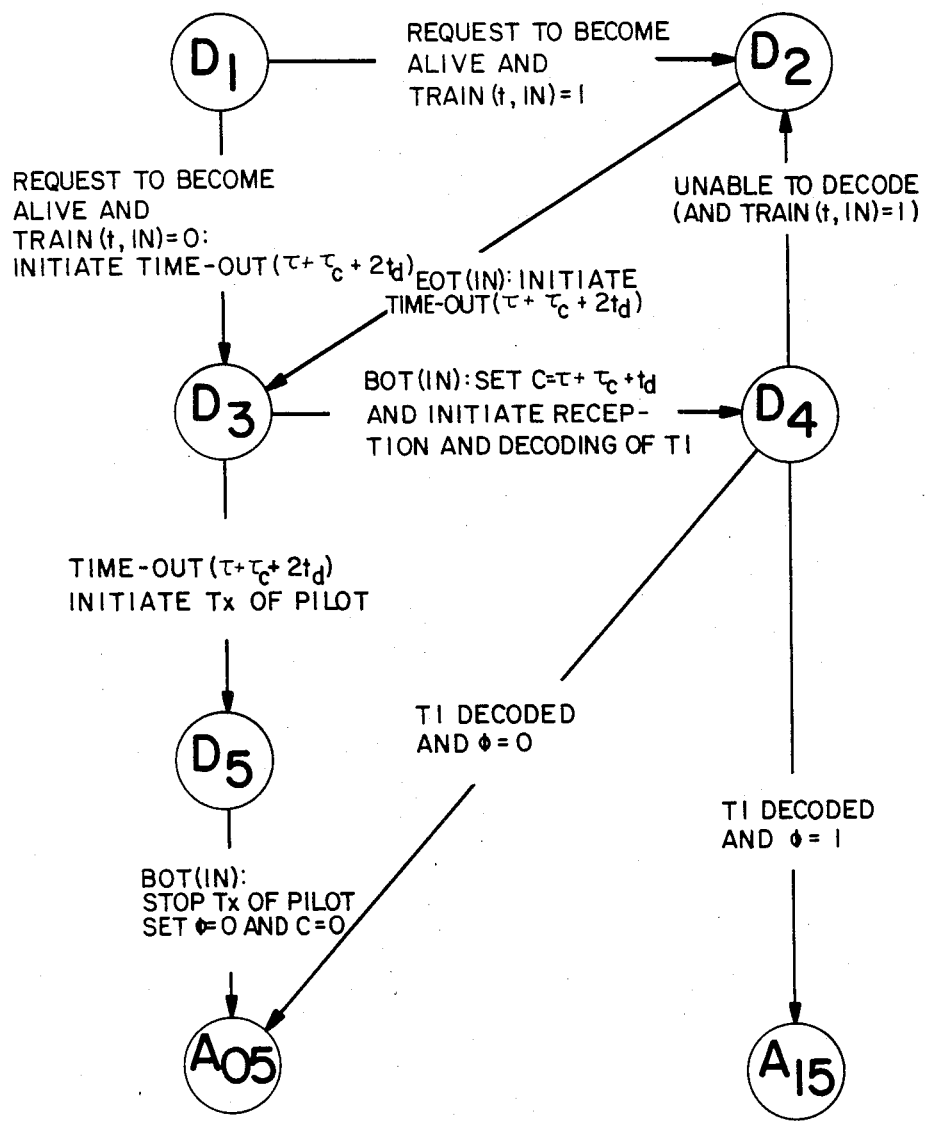
FIG.—10  FINITE STATE MACHINE IMPLEMENTING THE INITIALIZATION PORTION OF THE VOICE/DATA ALGORITHM.

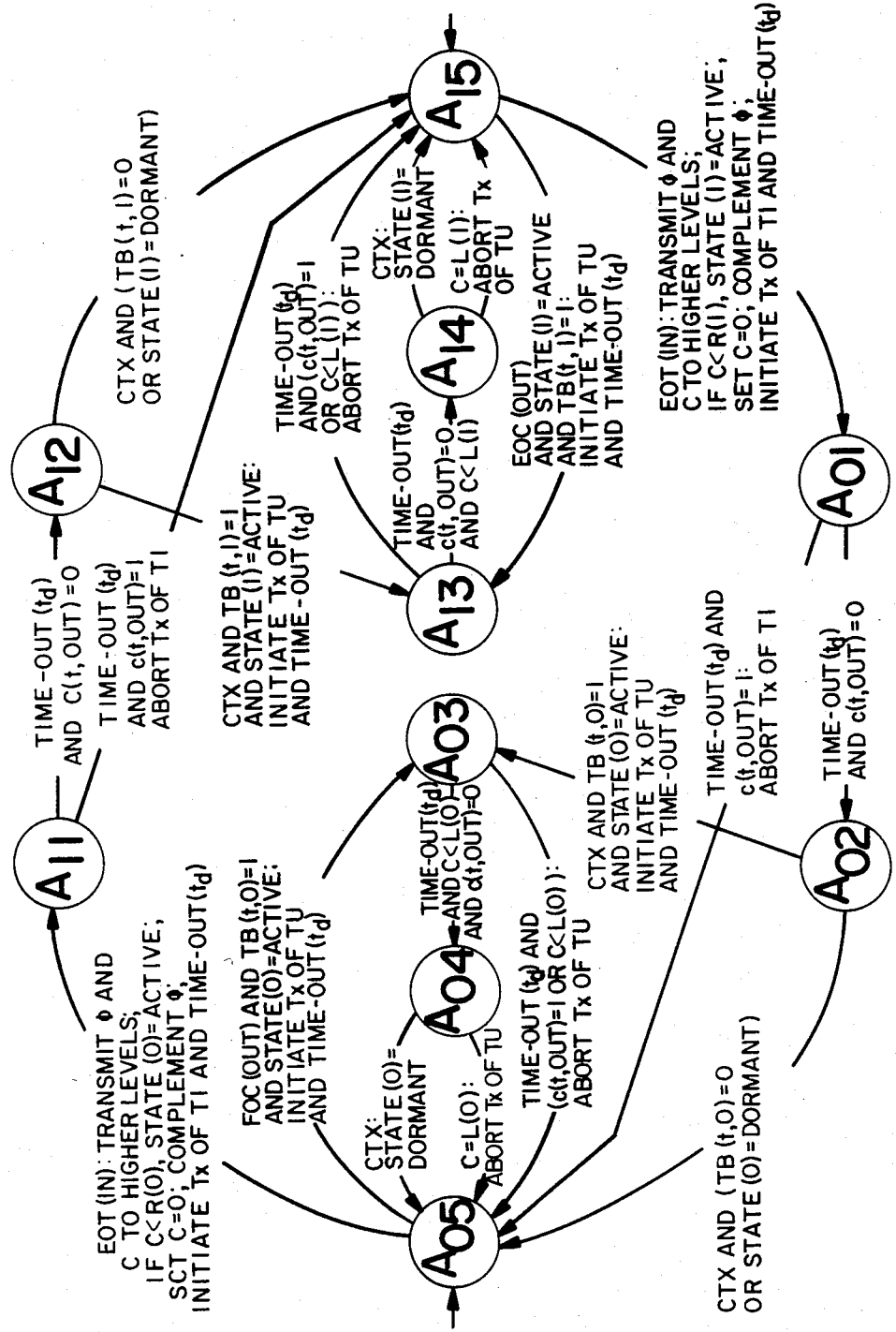
FIG.-11 FINITE STATE MACHINE IMPLEMENTING THE PORTION OF THE VOICE/DATA ALGORITHM EXECUTED BY A STATION IN THE ALIVE STATE.

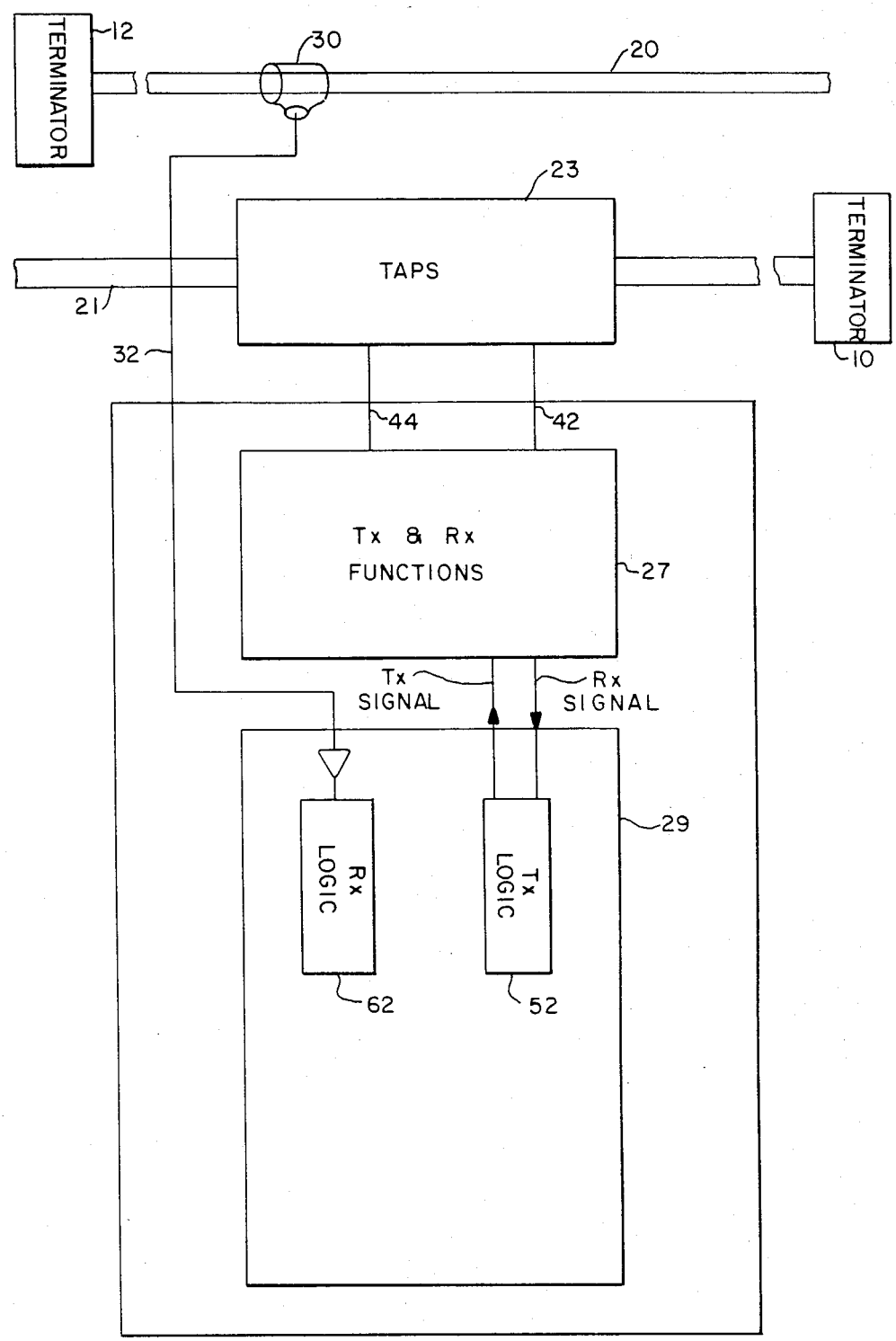
FIG.—12

LOCAL AREA COMMUNICATION NETWORK UTILIZING A ROUND ROBIN ACCESS SCHEME WITH IMPROVED CHANNEL UTILIZATION

BACKGROUND OF THE INVENTION

The present invention relates to a local area communication network.

A great deal of discussion can be seen in the recent literature regarding local networks and their applicability to many of today's local area communication needs. These needs have primarily consisted of data communication applications such as computer-to-computer data traffic, terminal-to-terminal data traffic, and the like. More recently, a new line of thought has been apparent. It is the desire to integrate voice communication on local data networks. The reason for this is threefold: (i) voice is an office communication application just as computer data, facsimile, etc.; (ii) recent advances in vocoder technology have shown that digitized speech constitutes a digital communication application which is within the capabilities of local area data networks; and (iii) today's local network architectures, especially the broadcast bus type, offer very elegant solutions to the local communications problems, from both the point of view of flexibility in satisfying growth and variability in the environment.

While existing solutions are elegant, they are not without their limitations in performance. Some of these limitations arise as the characteristics of the environment and data traffic requirements being supported by these solutions deviate from those assumed in the original design. Examples of such characteristics are: Packet length distribution, packet generation pattern, channel data rate, delay requirements and geographical area to be spanned.

One prior art approach is a bidirectional broadcast system (BBS) architecture based on a carrier sense multiple access (CSMA) mechanism as exemplified by the so-called ETHERNET. Another prior art approach is a unidirectional broadcast system (UBS) architecture with a round-robin access scheme.

A problem with a CSMA bidirectional broadcast system is that it can be shown that the effort required to achieve higher channel bandwidths with the hope of achieving a network throughput proportional to the channel speed is unfortunately rewarded only by a marginal improvement.

The limitation with unidirectional broadcast systems operating with the existing round-robin scheme is that the maximum throughput for such a system exhibits similar performances as for a CSMA bidirectional broadcast system, and as such both approaches suffer of an overhead per packet transmission.

There is a need therefore for an improved local area communication network which overcomes the problems of prior art systems. In view of the above background, it is an objective of the present invention to provide an improved local area communication network.

SUMMARY OF THE INVENTION

The present invention relates to a local area communication network.

In one embodiment, the present invention is based upon a unidirectional broadcast system and utilizes an access protocol based uon a round robin access protocol. In another embodiment, the present invention does not require signal propagation to be unidirectional, and still utilizes a round-robin access protocol. In either case, the present invention, however, is performance-wise more efficient than existing schemes and overcomes many of the limitations. Moreover, the present invention can be shown to be particularly suitable for the integration of voice and data applications having a simple voice/data protocol which allows the network to meet bandwidth requirements and maximum packet delay constraints for voice communication at all times, all guaranteeing a minimum bandwidth requirement for data traffic.

These requirements are satisfied by blocking requests for voice communication which exceed a maximum allowable number, where this maximum number is given as a function of the vocoder's rate and a minimum data bandwidth requirement, and is easily enforceable in practice.

In accordance with the foregoing summary, the present invention achieves the objective of providing an improved local area communication network.

Other objects and features of the present invention will become apparent from the following detailed description when taken in conjunction with the accompanying drawings.

BRIEF DESCRIPTION OF THE DRAWINGS

FIG. 1 depicts a representation of maximum throughput of prior art local area communication networks.

FIGS. 2A-2G depict channel taps which could be utilized with the present invention.

FIGS. 3A and 3B depict examples of block diagrams of a local area communication network topology according to the present invention.

FIGS. 4 and 5 depict timing diagrams for illustrating the operation of the present invention.

FIG. 6 depicts a flow chart illustrating the sequence of operations for the access protocol according to the present invention.

FIG. 7 depicts a finite state machine implementing the access protocol according to the present invention.

FIG. 8 depicts a flow chart for the initialization portion of the voice/data algorithm according to the present invention.

FIG. 9 depicts a flow chart for the main portion of the voice/data algorithm executed by a station in the local network.

FIG. 10 depicts a finite state machine implementing the initialization portion of the voice/data algorithm.

FIG. 11 depicts a finite state machine implementing the main portion of the voice/data algorithm executed by a station in the network.

FIG. 12 depicts a block diagram of a station according to the present invention.

DETAILED DESCRIPTION OF THE DRAWINGS

Figure 13:
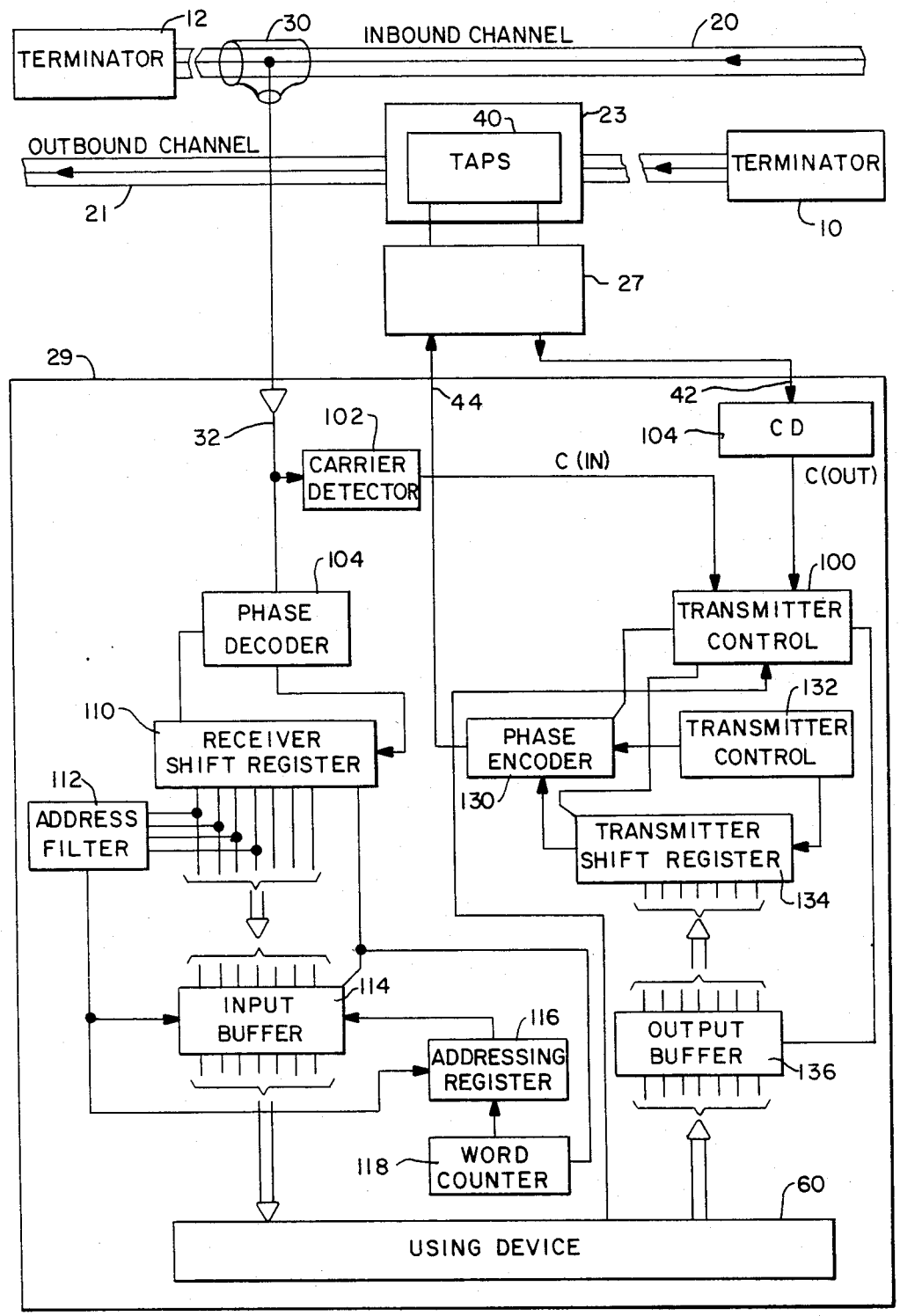
FIG. 13 depicts a more detailed diagram of a station according to the present invention.

In the bidirectional broadcast system (BBS) architecture, all devices share a single communication medium, typically a coaxial cable, to which they are connected via passive taps. When transmitted by a device, signals propagate in both directions, thus reaching all other devices. The device interface is such that it recognizes and accepts messages addressed to it.

The difficulty in controlling access to the channel by users who can only communicate via the channel itself has given rise to what is known as random access techniques. The best known such schemes are ALOHA and Carrier Sense Multiple Access (CSMA). In the ALOHA scheme, users transmit any time they desire. When conflicts (consisting of overlapping packet transmission) occur, the conflicting users schedule retransmission of their packets to some later time, incurring a random rescheduling delay. In CSMA, the risk of a collision is decreased by having users sense the channel prior to transmission. If the channel is sensed busy, then transmission is inhibited. There are several CSMA protocols. In the so-called nonpersistent CSMA, a user which finds the channel bus simply schedules the retransmission of the packet to some later time. In the p-persistent CSMA, a user which finds the channel busy monitors the channel, waits until the channel goes idle, and then performs the "p-process" which consists of transmitting the packet with probability p, and waiting the maximum end-to-end propagation delay with probability 1-p; at this point in time, it senses the channel and again if the channel is sensed idle, it repeats the p-process, othewise it repeats the entire procedure.

Given the physical characteristics of digital transmission, on coaxial cables, in addition to sensing carrier it is possible for transceivers to detect interference among several of their colliding packets. This gives rise to a variation of CSMA which is referred to as Carrier Sense Multiple Access with Collision Detection (CSMA-CD). In the so-called Ethernet network, users employ th p-persistent CSMA-CD protocol along with a scheduling procedure, called the binary exponential back-off; it consists of having the colliding users incur a random delay whose mean is doubled each time a collision is incurred.

The performance of a bidirectional broadcast system is heavily dependent on the particular access method used, and is characterized by two main measures: channel capacity and throughput-delay tradeoff. For a given access mode, channel capacity is defined as the maximum throughput that the network is able to support. The throughput-delay measure is the relationship which exists between packet delay and channel throughput. It should be clear that, due to collisions and retransmissions, channel capacity is always below the available channel bandwidth, and that throughput and delay have to be traded off; the larger the throughput is, the larger is the packet-delay.

Let W denote the channel bandwidth (in bits/-seconds), d the length of the cable between the extreme users, and B the number of bits per packet (assuming fixed size packets). Let $\tau$ denote the end-to-end delay defined as the time from the starting of a transmission to the starting of reception between the extreme users, and T denote the transmission time of a packet; i.e., T=B/W. In all CSMA protocols, given that a transmission is initiated on an empty channel, it is clear that it takes at most $\tau$ sec. for the packet transmission to reach all devices; beyond this time the channel is guaranteed to be sensed busy for as long as data transmission is in progress. A collision can occur only if another transmission is initiated before the current one is sensed. Thus, the first $\tau$ sec. of a packet transmission represents its (maximum) vulnerable period and plays a key role in determining the performance of CSMA protocols. Among all protocols previously mentioned, the p-persistent CSMA-CD provides the best performance, and thus is considered as the benchmark for CSMA schemes. The results are derived from a worse case analysis in which the vulnerable period of a packet is always considered equal to its maximum. Although it is possible to predict better performance if one took into account the fact that the vulnerable period of a transmission is variable, the result would become dependent on the particular environment (namely, the geographical distribution of devices) and the particular traffic pattern (i.e., the source-destination traffic distribution), and would be rather difficult to evaluate. In order to study the limitations of the scheme considered and in an attempt to keep the results as general as possible, a worse case analysis is undertaken throughout the paper for all schemes considered.

It has been shown that the throughput of the slotted nonpersistent CSMA-CD scheme is given by $$S = \frac{Tg\, e^{-g}}{Tge^{-g} + (1 - e^{-g} - ge^{-g})T_c + 1} \quad (1)$$

where g is the rate at which stations become ready during a slot of size $\tau$, T is again the transmission time of a packet and $T_c$ is the time needed to detect a collision and stop transmitting. Both T and $T_c$ are measured in units of slots. Setting $T_c$ to its minimum value ($T_c=2$), S is maximized, as T changes, for a value of g practically constant and equal to 0.65. The maximum throughput (or channel capacity) $S_{max}$ is therefore given by $$S_{max} = \frac{T}{T + 3.76} = \frac{1}{1 + 3.76\frac{\tau W}{\beta}} \quad (2)$$

Using estimates for the various delays through interface components and for the propagation delay in coaxial cables as given in the Ethernet Specifications, one finds that a rough estimate for $\tau$ is 10 microseconds for each km of cable (assuming one repeater for each 500 m of cable), and thus the product $\tau$ W is equal to 10 bits for each MBPS bandwidth and each km of cable.

In FIG. 1 $S_{max}$ is plotted as a function of W for various values of the ratio d/B, where d is in kilometers and B in kilobits. Consider for example B=1 KB and d=1 Km. While with W=1 MBPS one can achieve a throughput of 0.96 MBPS, with W=10 MBPS, $S_{max}$ is equal to 7.26 MBPS, and when W=20 MBPS then $S_{max}$=11.4 MBPS. If packets are shorter, say 250 bits, then with W=1 MBPS $S_{max}$=0.87 MBPS; with W=10 MBPS, $S_{max}$ is only 4 MBPS. The effort required to push the technology to higher channel bandwidth with the hope to achieve a network throughput proportional to the channel speed is unfortunately rewarded only by a marginal improvement. The need to seek better solutions is thus clear.

Just as with BBS, a unidirectional broadcast system (UBS) consists of a single bus to which all users are connected. Transmitting taps, however, are such that the transmitted signals are forced to propagate in only one direction, attenuating heavily the signals in the opposite direction. Broadcast communication is then achieved by various means, such as folding the cable, or repeating all signals on a separate channel (or frequency) in the reverse direction, so that signals transmitted by any user reach all other users on the reverse path. Thus the system may be considered as consisting of two channels: the outbound channel which all users access in order to transmit, and the inbound channel which users access in order to read the transmitted information. In addition to the transmitting capability on the outbound channel, users can sense activity on that channel in a way similar to that required in other channel sensing systems such as CSMA. In a UBS this capability results in an interesting feature. Assume users are numbered sequentially S1, S2, S3, etc., and user S1 is defined as the "farthest", i.e., possessing the longest round trip delay between its transmitting tap and its receiving tap. Because of the undirectional signalling property, S2 is able to sense signals generated by S1 on both the inbound and outbound channels whereas the opposite does not hold; that is, S1 can sense signals generated by S2 only on the inbound channel. This asymmetry is utilized in establishing the ordering required for a round-robin (RR) scheme, which is now described.

In the RR algorithm, a user is considered to be in one of three states. It is in the IDLE state if it does not have any message awaiting transmission. A non-idle user, called a ready user, assumes for fairness purposes one of two states: ACTIVE if it has not transmitted its message in the current round, or DORMANT if it did transmit in the round and is waiting for the completion of the round. In order to achieve fair scheduling, DORMANT users defer to all other ACTIVE users. Consequently, it is apparent that no user will transmit its second message before other ready users have had a chance to transmit their first ones. Eventually all ready users will have transmitted their message (i.e., they all become DORMANT); this constitutes the end of a round; at this time all users reset their state to ACTIVE and a new round starts.

While each user distinguishes between its DORMANT and ACTIVE states, arbitration among active users must be provided by additional means. To that end each ACTIVE user transmits a short burst of unmodulated carrier after the end of the previous message has been detected on the inbound channel, thus indicating its ACTIVEness and at the same time senses the outbound channel. All but one ACTIVE user will sense the outbound channel busy (due to transmission from users with a lower index) thus singling out the next user to transmit. If a given user senses the outbound channel busy, then there exists at least one ready user "ahead" of it which generated that signal; a user will always defer its transmission in favor of those "ahead" of it.

Initially all users reset their state, meaning that all ready users are ACTIVE. An ACTIVE user will operate as follows:
1. Wait until the next end-of-carrier (EOC) is detected on the inbound channel.
2. Transmit a short burst of unmodulated carrier and listen to the outbound channel for one round trip delay.
3. If during that period the outbound channel is sensed idle, the user transmits its message and switches to the DORMANT state. Otherwise, the user repeats the algorithm.

A DORMANT user becomes ACTIVE if the inbound channel is sensed idle for one round trip delay or longer and then performs the above steps.

In other round-robin disciplines, each user, in a prescribed order, is given a chance to transmit; it transmits if it has a message ready and declines if it has not. This user will not be given a second chance before all other users have had their chance. In the present algorithm, while no user transmits more than once within each "round", the order of transmission within the round may vary depending on the instants at which messages arrive. For example, assume that user S1 just completed transmission of its message. Assume also that at this time S2 does not have a message ready and therefore S3, assumed ready, transmits next. While S3 is transmitting, a message arrives at S2, and consequently when S3 is finished, S2 transmits next. The order of transmission in this case is S1, S3, S2 while if all had a ready meassage at the beginning of the round the order would have been S1, S2, S3.

From the above algorithm, it is clear that all transmissions are conflict free. The time separating two consecutive packet transmissions depends on the relative position of the devices transmitting them. The best case is observed when the successive transmitting users are among the highest indices. In this case neglecting the transmission time of a burst as well as the delay incurred between the two taps (on the inbound and outbound channels) of the subscriber with the highest index, it can be seen that the time separating two consecutive transmissions can be as low as $2\tau$ sec., i.e., the longest round trip delay. The worst case is observed when the two successively transmitting users are with the lowest indices. In that case the gap is about $4\tau$ sec. Note also that due to the transmission of bursts when not all users are in the DORMANT state, the inbound channel is never idle for a period longer than $2\tau$ sec. The channel idle time will exceed $2\tau$ sec., if either all users are DORMANT or all users are IDLE. Thus it can be seen that the gap between two rounds in the former case is between $4\tau$ and $6\tau$.

To study the channel capacity of a UBS employing the RR algorithm, assume that M users are always ready to transmit (i.e., we assume heavy traffic conditions). In this case the maximum throughput is given by $$\frac{MT}{M(T + 4\tau) + 6\tau} \leq S_{max} \leq \frac{MT}{M(T + 2\tau) + 4\tau} \quad (3)$$

The lower bound is also expressed as $$S_{max} = \frac{B}{B + 4\tau W + \frac{6\tau W}{M}} \quad (4)$$

If M is not too small, then one can neglect 6 W/M and get $$S_{max} = \frac{1}{1 \times 4\frac{\tau W}{\beta}} \quad (5)$$

Note: The upper bound on channel capacity can be achieved if, following the transmission of the burst, a device waits a period of time shorter than $2\tau$, namely $2\tau$ minus the propagation time between its tap on the outbound channel and its tap on the inbound channel. The drawback of such a mode of operation, however, is that this parameter has to be tuned according to the position of the device on the cable.

In FIG. 1, the lower bound on $S_{max}$ for the RR algorithm is plotted. Both RR and CSMA-CD exhibit similar performance and both suffer of an overhead per packet transmission which is dependent on the ratio W/B. The removal of such a dependent will provide the ultimate performance, which is an objective of the present invention and which will be described hereinbelow.

As with the UBS architecture, the present invention is based upon a broadcast communication system comprising an outbound channel and an inbound channel, a plurality of stations connected to both the outbound and inbound channels, transmitting on the outbound channel and receiving on the inbound channel. The communication medium constituting the outbound and inbound channels may be a twisted pair, a coaxial cable, an optical fiber, or a wave guide. The channel access protocol for transmission on the outbound channel is based upon the round-robin scheme described for the UBS architecture with the advantage of utilizing the channel bandwidth more efficiently than the RR algorithm even when packet transmission times are short and cable distances are long.

In one embodiment, transmitters on the outbound channel may be of the undirectional type rendering the invention a UBS; in another embodiment, signal propagation on the outbound channel is not required to be undirectional, and thus bidirectional transmitters may be utilized. As it is easier and simpler to present the concepts underlying the invention when unidirectionality of signal propagation is guaranteed than when transmitters are bidirectional. The preferred embodiment is considered at first to be a UBS architecture and defer to a later section discussion of the case where the constraint of unidirectionality is relaxed.

The gist is basically the following. Consider the UBS architecture, contrary to a RR algorithm where the time reference used in determining the right of way is the end-of-carrier on the inbound channel (EOC(IN)), in the access protocol of the present invention the time reference used is the end-of-carrier on the outbound channel (EOC(OUT)). The mechanism used in determining the access right to users in a given round is thus made independent of the propagation delay $\tau$, thus decreasing the gaps between consecutive transmissions to values on the same order of magnitude as the time needed to detect carrier. Secondly, the idle time separating two consecutive rounds is kept as small as a round trip propagation delay. The details of the scheme are as follows:

A. The events EOC(IN) and EOC(OUT)

Let the boolean function c(t,OUT) be defined as $$c(t,\text{OUT}) = \begin{cases} 1 & \text{if carrier is detected present} \\ & \text{on the outbound channel at time } t \\ 0 & \text{otherwise} \end{cases}$$

Note, that c(t,OUT) signals the presence or absence of carrier with a delay of $t_d$ sec., where $t_d$ is the time required for the detection operation. It is assumed here that the carrier detector is placed very close to the channel. (Other arrangements are also possible as set forth below.) The event EOC(OUT) is said to occur when c(t,OUT) undertakes a transition from 1 to 0. In a similar way c(t,IN) and EOC(IN) are defined.

B. Transmission Units (TU)

A transmission unit consists of a preamble followed by the information packet itself. Transmission units and information packets may be of fixed or variable size. The preamble is for synchronization purposes at the receivers. It is sufficiently long for the receivers to detect presence of the unit, and then to synchronize with bit and packet boundaries.

C. Bus Transceivers

For every station in the system, the transmitting device is connected to the outbound channel while the receiving device is connected to the inbound channel. It is noteworthy that, regardless of what type the transmitters are (unidirectional or bidirectional), given the kind of topologies under consideration for the invention and given the way the outbound and inbound channels are connected, signals propogate on the inbound channels always in the same direction.

One of the basic features required for the round-robin algorithm and the access protocol of the invention is the ability for each station to sense, on the outbound channel, the carrier due to transmissions by stations on the upstream side of its transmitter; (i.e., those stations whose transmit taps on the outbound channel are more distant from the inbound channel than the transmitter of the station in question.)

Restricting again the discussion to the unidirectional case, note that there are several ways for achieving the necessary functions on a coaxial cable or twisted pair. Described herein are feasible alternatives disregarding any consideration of complexity, cost, or implementation preference. One way of achieving unidirectionality of transmission is to use such means as unidirectional amplifiers between every two consecutive transmit taps on the outbound channel. In this case the transmit taps can be "passive" T-connectors (such as those used in ETHERNET) and therefore do not require splicing of the cable for installation; the unidirectional means however do require splicing of the cable and are active elements. To achieve sensing of carrier signals generated by stations on the upstream side of a tap 33, one of two options exist: (i) provide an additional (passive) tap 31 on the upstream side of the amplifier 29 which is on the upstream side of the tap 33 (as shown in FIG. 2A), or (ii) operate with a single tap 33, but provide means 27 within each station to detect presence of signals and to detect collisions due to overlap in transmission with upstream signals (as achieved in ETHERNET and as depicted in FIG. 2B).

Another way to achieve unidirectionality is by considering the transmit tap itself to be an active device comprising a receiver on the upstream end, a transmitter on the other end, and an adder in-between which allows new inputs from the station to be transmitted on the channel. The carrier sensing capability of upstream signals is achieved by sensing activity at the output of the receiver 23 (See FIG. 2C).

An alternative is the use of directional coupler. A possible implementation is depicted in FIG. 2D. Two (passive) bidirectional transmitting taps 31, 33 such as T-connectors are connected to the bus at a specified distance from each other such that the signal's propagation delay from one tap to the other is $\tau_d$ (in delay 37). Referring to FIG. 2D, if the desired signal s(t) is to propagate in one direction, say to the right of the station, then the station must transmit i(t) at tap A and $-i(t-\tau_d)$ at tap B, where i(t) is such that $$s(t) = i(t) - i(t - 2\tau_d).$$

Indeed this guarantees that s(t) will propagate to the right of tap A while all signals cancel each other to the left of B. Sensing "upstream" signals is simply achieved by providing the carrier sensing capability at tap B. Note that the same functions can also be implemented by passive directional couplers 35 using transformers as seen in FIG. 2E.

D. Basic Mechanism to Transmit Transmission Units

A station $S_i$ which senses the outbound channel busy, waits for EOC(OUT). Immediately following the detection of EOC(OUT), it starts transmission of its unit. Simultaneously, it senses carrier on the outbound channel (on the upstream side of its transmit tap). If carrier is detected (which may happen in the first $t_d$ sec. of the transmission, and which means that some station $S_j$ with a lower index has also started transmission following its detection of stations which were able to detect EOC(OUT). Clearly, during and following the transmission of its TU, a station will sense the outbound channel idle, and therefore will encounter no EOC(OUT), and will not be able to transmit another TU in the current round. Thus in this mechanism, there is no need to distinguish between DORMANT and ACTIVE states, as required in the previous round-robin algorithm.

Note that the possible overlap among several transmission units is limited to the first $t_d$ sec. of these transmissions. It is assumed that the loss of the first $t_d$ sec. of the preamble of the nonaborted transmission will not jeopardize the synchronization process at the receivers. According to the above basic mechanism, two consecutive transmission units are separated by a gap of duration $t_d$ sec., the time necessary for all other stations to detect EOC(OUT).

The succession of transmission units transmitted in the same round is called a train. A train can be seen by a station on the outbound channel only as long as the train units (TU's) in it are being transmitted by stations with lower indices. A train generated on the outbound channel is entirely seen by all stations on the inbound channel. Since there is a gap of duration $t_d$ sec. between consecutive TU's within a train, the detection of presence of a train on the inbound channel can be best achieved by defining the new boolean function $TRAIN(t,IN) = c(t-t_d,IN) + c(t,IN)$. Clearly, $$TRAIN(t, IN) = \begin{cases} 1 & \text{as long as train is in progress on the inbound channel at time } t \\ 0 & \text{otherwise} \end{cases}$$

The transition $TRAIN(t,IN): 1 \to 0$ defines the end of a train (EOT(IN)), and the transition $TRAIN(t,IN): 0 \to 1$ defines the beginning of a train (BOT(IN)).

E. The Topology of the Present Invention

After the last TU in a train has completed transmission, a mechanism is needed to start a new train of transmission units. Clearly, it is essential that this mechanism gives access right to the ready station with the lowest index. One may use a mechanism similar to algorithm RR itself. That is, as soon as EOT(IN) is detected, ready stations transmit a burst, monitor the outbound channel for $2\tau$ sec. and then transmit or inhibit transmission depending on whether carrier is absent or present during the $2\tau$ sec. period respectively. The drawback, as mentioned above, is the introduction of a gap between consecutive trains of duration between $2\tau$ and $4\tau$ sec.; (or just $2\tau$ sec. if the implementation of the scheme in each station is made dependent on the position of the station).

In order to keep this gap as small as possible, one should be able to have the event used as reference (namely, EOT(IN)) visit the receivers in the same order as the stations' indices, which is also the order in which they can transmit. This is achieved if the inbound channel is such that signals on it are made to propagate in the same direction as on the outbound channel.

Consider the network topology to comprise an outbound channel and an inbound channel which are parallel and on which signals propagate in the same direction (i.e., visiting stations in the same order), and a connection between the outbound channel and the inbound channel to allow the broadcast of all outbound signals on the inbound channel. The propagation delay along the connection $\tau_c$ is anywhere between 0 sec. and $\tau$ sec., (where $\tau$ is the end-to-end propagation delay on the outbound or inbound channel), depending on the geographical distribution of the users and the way the inbound and outbound channels are connected. As illustrated in FIG. 3A, in which stations S1-SN are connected to communication bus 20 having terminators 10 and 12. The minimum of 0 sec. is observed, for example, if the inbound and outbound channels have a loop shape (or, more generally speaking, the stations with the lowest and highest indices are collocated). The maximum of $\tau$ sec. is observed if the connection cable 26 is made parallel to the inbound and outbound channels, as shown in FIG. 3(B). The propagation delay between the outbound tap and inbound tap for all stations is fixed and equal to $\tau + \tau_c$.

The major feature of this topology rests on the fact that, when the inbound channel is made exactly parallel to the outbound channel, the event EOT(IN), used by all stations as the synchronizing event to start a new train, will reach any station exactly at the same time as the carrier on the outbound channel due to a possible transmission by a station with a lower index. This helps resolve the overlap of several transmission at the beginning of a train in just the same manner as the resolution obtained in the basic mechanism for transmitting TU's. This mechanism again allows the ready station with the lowest index to be the first to complete transmission of its TU, and following that the new train will take its normal course. The time gap between two consecutive trains, defined as the time between the end of the last TU in a train and the beginning of the first TU in the subsequent train, is now $\tau + \tau_c + 2t_d$ sec., as seen in FIG. 4.

It is worthwhile to note here that this topology also brings improvements to the original RR access algorithm. With such a topology, the RR algorithm can be modified so that a ready station in the ACTIVE state performs as follows:
1. Wait for EOC(IN).
2. Begin transmission of TU, and simultaneously listen to the outbound channel.
3. If within $t_d$ sec. the outbound channel is sensed idle, then complete transmission of TU (free of conflict) and switch to the DORMANT state; otherwise abort transmission and repeat the algorithm.

In this situation, the gap between any two consecutive TU's in a round is exactly $\tau + \tau_c + t_d \leq 2\tau + t_d$, a fixed amount equal to the minimum possible.

F. The Cold-Start Procedure, and Keeping the Invention "ALIVE"

The above algorithm and mechanisms are valid only if there are always events to which actions are synchronized, namely EOC(OUT) and EOT(IN). This assumes that at all times some station is ready, and therefore trains contain at least one TU and are separated by gaps of fixed duration $\tau + \tau_c + 2t_d$. When this is not the case, the idle time on the inbound channel exceeds $\tau + \tau_c + 2t_d$ sec. A station which becomes ready at time $t_o$ such the (i) TRAIN $(t_o, \text{OUT}) = 0$ (thus indicating that no EOC(OUT) will be encountered to synchronize action $t_o$) and (ii) TRAIN $(t, \text{IN}) = 0$ during the entire period of time $[t_o, t_o + \tau + \tau_c + t_d]$ (thus indicating that no EOT(IN) will be detected), has to undertake a so-called cold-start procedure. This procedure must be designed such that if executed by several stations becoming ready under these conditions, it leads to a single synchronizing event to be used as a time reference, followed then by an orderly conflict-free operation of the network.

The simple one proposed here consists of the following. Once a station has determined that a cold-start procedure is needed, it transmits continuously an unmodulated carrier (called PILOT) until BOT(IN) is detected. At this time the station aborts transmission of the pilot. It then waits for EOT(IN) (consisting of the end of the pilot) and uses that event as the synchronizing event. (Of course, an alternative could be to use the BOT(IN) due to the pilot as the synchronizing event.) It is possible that pilots transmitted by several users overlap in time. This, however, will cause no problem. Note that as long as pilots are aborted as soon as BOT(IN) is detected, it is guaranteed that the resulting pilot as observed on the inbound channel is continuous and of length $\tau + \tau_c + 2t_d$ sec. Following its end, there will be the normal gap of size $\tau + \tau_c + 2t_d$ before a TU follows. (Of course, this gap is absent if BOT(IN) is used as the synchronizing event.)

Assume that no station is ready when EOT(IN) is detected. The network is then said to go empty. The first station to become ready when the network is empty spends $\tau + \tau_c + t_d$ sec. to determine the empty condition, by examining TRAIN(t,IN), after which is starts transmission of the pilot. Then it takes between $\tau_c + t_d$ and $\tau + \tau_c + t_d$ seconds before it detects BOT(IN). (The minimum $\tau_c + t_d$ is observed if the station in question is the lowest index station, and the highest index station happened to become ready exactly at the same time.) Regardless of which is the case, following BOT(IN) a pilot of length $\tau + \tau_c + t_d$ sec. is observed on the inbound channel, followed by the gap of $\tau + \tau_c + 2t_d$ sec. and then the transmission unit. Therefore, with the use of the PILOT, the time between the moment at which the first station becomes ready in an empty network and the moment at which the next EOT(IN) (due to the end of PILOT, and representing the synchronizing event) reaches the lowest index station is between $2\tau + 3\tau_c + 4t_d$ and $3(\tau + \tau_c) + 4t_d$ sec. This is the time needed to start a new round and is to be compared to $\tau + \tau_c + 2t_d$ sec. which is the time needed when the network does not become empty. FIG. 5 shows the timing of the cold-start procedure when only one station becomes ready.

To avoid the cold-start operation each time the network goes empty, one needs to guarantee that, as long as some stations may still become ready in the future, synchronizing events (namely, EOT(IN), are created artificially by all such stations. More precisely, consider a station to be in one of two states: DEAD or ALIVE. A station which is in the ALIVE state has responsibility to perpetuate the existence of the synchronizing event EOT(IN) for as long as it remains in that state. To accomplish this, each time EOT(IN) is detected, the station transmits a short burst of unmodulated carrier, of duration sufficiently long to be very reliably detected (i.e., of a duration of at least $t_d$ sec.). Such a burst is called LOCOMOTIVE. If the train were to be empty (i.e., no stations were to be ready when EOT(IN) is detected), now the LOCOMOTIVE constitutes the TRAIN, and EOT(IN) is guaranteed to take place. Clearly, if some station which is ALIVE is also ready, then immediately following the LOCOMOTIVE, it initiates transmission of its TU and follows the transmission mechanism giving access right to the lowest index. The network is said to be ALIVE if at least one station in the network is ALIVE, otherwise it is said to be DEAD. A station is said to be in the DEAD state if it is not engaging in keeping the network ALIVE, and therefore is prohibited from transmitting any TU. To be able to transmit, a station has to become ALIVE. For a DEAD station to become ALIVE, it must first determine whether the network is ALIVE or not. Letting t denote the time at which a DEAD station wishes to become ALIVE, the network is determined ALIVE if a train is detected on the inbound channel anytime in the interval $[t, t + \tau + \tau_c + t_d]$. Otherwise, it is determined DEAD. If the network is determined ALIVE, then the station simply switches to the ALIVE state and acts accordingly. Otherwise, it executes the cold-start procedure following which it becomes ALIVE.

A station which is ALIVE can be either READY or NOT-READY at any moment. This is determined by the state of its transmit buffer, empty or nonempty. To that effect, a function TB(t,X) for station X is defined as $$TB(t,X) = \begin{cases} 1 & \text{if its transmit buffer is nonempty} \\ 0 & \text{otherwise} \end{cases}$$

An ALIVE station which becomes ready does not have to wait for EOT(IN) to undertake the attempts to transmit its packet. In fact, if an outbound train is observed, the station synchronizes transmissions with EOC(OUT). If, however, at the time it becomes ready, no train is observed on the outbound channel, then EOT(IN) is the synchronizing event.

G. The Access Protocol

Having defined above c(t,OUT), c(t,IN), TRAIN(t,IN), TB(t,X), BOT(IN), EOT(IN), EOC(IN) and EOC(OUT), CTX is now defined as the event corresponding to the completion of transmission of the current TU, given that such a transmission has been initiated. Also, TIME-OUT($\alpha$) is defined as the event corresponding to the completion of a period of time of duration $\alpha$, starting the clock at the time when waiting for the event is initiated. From the above discussion, PILOT may be defined as a continuous unmodulated carrier, and LOCOMOTIVE as an unmodulated carrier of duration $t_d$.

Consider that initially station X is in the DEAD state. Upon command (for bringing the station to the state ALIVE and eventually for transmission of data), the following basic algorithm is executed.

Step 1.

[Check whether the network is ALIVE or not. If it is then proceed with Step 2, otherwise undertake the "cold-start" procedure and then proceed with Step 2.] If TRAIN (t,IN)=1 (i.e., the network is already ALIVE, go to Step 2. Otherwise, wait for the first of the following two events: BOT(IN) or TIME-OUT($\tau + \tau_c + t_d$). If BOT(IN) occurs first (then again it means that the network is ALIVE), go to Step 2. If on the contrary TIME-OUT($\tau + \tau_c + t_d$) occurs first (indicating that the network is not ALIVE, and that station X must undertake the "cold-start" procedure), transmit PILOT immediately at the occurrence of TIME-OUT($\tau + \tau_c + t_d$), and maintain transmitting it until BOT(IN) is detected, at which time abort transmission of PILOT and proceed with Step 2.

Step 2.

Wait for the first of the following two events: EOC(-OUT) and EOT(IN). If EOC(OUT) occurs first, then go to Step 4. Otherwise go to Step 3.

Step 3.

[A new train has to be started.] Transmit a LOCOMOTIVE and go to Step 4.

Step 4.

[Determine the current state of the station. If it is ready, then attempt transmission of the TU packet.] If TB(t,X)=0, go to Step 2. Otherwise initiate transmission of the TU. If $t_d$ sec. later c(t,OUT)=1 (meaning it is not station X's turn), then abort transmission and go to Step 2. Otherwise, complete transmission of the packet and go to Step 2.

In FIG. 6 the flow chart of this basic algorithm is depicted. In FIG. 7, the diagram for a finite state machine which performs the algorithm is depicted, containing seven states. The states labeled $D_1$, $D_2$ and $D_3$ are assumed when the station is DEAD and is in the process of becoming ALIVE; the states labeled A1 through A4 are assumed when the station is ALIVE. Each possible transition is labeled by the combination of events which causes the transition, followed by the action taken.

H. Performance of the Access Protocol

The introduction of the LOCOMOTIVE increases the length of a train by $t_d$ sec. The maximum throughput is evaluated as the ratio of the time in a train spent for data transmission to the time separating the beginning of consecutive trains and is given by $$S_{max} = \frac{MT}{M(T + T_d) + \tau + \tau_c + 2t_d} \quad (6)$$

Neglecting $t_d$ in comparison to T and $\tau + \tau_c + 2t_d$ in comparison to MT, FIG. 6 shows that $S_{max}$ is nearly one.

In the above discussion, it is assumed that the carrier detector and transmit logic of a station is collocated with its taps on the channel. Accordingly, the time it takes for the station's logic to respond to any of the four events EOC(OUT), EOT(IN), BOC(IN) and BOC(-OUT) is just the detection time $t_d$. When this is not the case, as in most applications, then adjustments in the protocol and its performance have to be made to take into account the propagation delay between a station and its tap. Let $\tau_s$ denote the maximum such delay over all stations. By a simple argument it can be shown that it takes a station $t_d + 2\tau_s$ to respond to the occurrence of any of the above-mentioned events on the channel. Note also that the possible overlap among several transmission units is now equal to $2\tau_s + t_d$ instead of just $t_d$, meaning that the preamble length has to be increased by $2\tau_s W$ bits, and additional overhead which needs to be taken into account in the performance analysis.

Denoting by $t_g$ the gap between two consecutive transmission units in a train, and by $t_{ov}$ the maximum duration of overlap among several transmission units, the maximum throughput is then given by $$S_{max} = \frac{MT}{M(T + t_g + t_{ov} - t_d) + \tau + \tau_c + t_g + t_d} \quad (7)$$

where $t_g = t_{ov} = 2\tau_s + t_d$. Neglecting $t_d$ in comparison to T and $\tau + \tau_c + t_g + t_d$ in comparison to $M(T + t_g + t_{ov})$ when M is large, Eq. 7 reduces to $$S_{max} = \frac{1}{1 + 4\frac{\tau_s}{T}} \quad (8)$$

As the introduction of $\tau_s$ causes degradation in channel throughput, one may conceive placing the critical functions of carrier detection and transmission abortion in the transceiver (close to the channel); then $t_{ov}$ can be kept as small as $t_d$, and Eq. 8 now becomes $$S_{max} = \frac{1}{1 + 2\frac{\tau_s}{T}} \quad (9)$$

Note that the introduction of $\tau_s$ calls for slight modifications to the various parameters used in the above description of the algorithm.

I. Integrating Voice And Data On The Network

It is assumed that vocoders digitize voice at some constant rate. Bits are grouped into packets which are then transmitted via the network to the destination vocoder. To achieve interactive speech and smooth playback operation, it is important to keep the end-to-end delay for each bit of information (from the time the bit is generated at the originating vocoder until it is received at the destination vocoder) within tight bounds. Two components of delay are identified: the packet formation delay and the network delay. The sum must not exceed the maximum allowed in order for all bits to satisfy the delay requirement of speech. An interesting property of round-robin schemes with finite number of stations is that the delay incurred in the transmission of a packet is always finite and bounded from above. This renders it particularly attractive for the packet voice application which is now examined in more detail.

Let $W_v$ be the bandwidth required per voice user (i.e., the vocoder's rate in bits/sec), and $D_v$ the maximum delay allowed for any bit of digitized voice (not including the propagation delay). Let $B_v$ denote the number of bits per voice packet. $B_v$ is the sum of two components: $B_v^{(1)}$ which encompasses all overhead bits comprising the preamble, the packet header and the checksum, and $B_v^{(2)}$ the information bits. Let $t_f$ be the time required to form a packet; it is also the packet intergeneration time for a vocoder. Let $T_v$ be the transmission time of a voice packet on a channel of bandwidth W. Then, $$t_f = \frac{B_v^{(2)}}{W_v} \tag{10}$$

$$T_v = \frac{B_v}{W} \tag{11}$$

Since packet generation is deterministic, occurring every $t_f$ sec., each voice user can be modeled by a D/G/1 queue. The packet service time, $D_n$, is the time from when the packet reaches the head of the queue, until it is successfully received at its destination. Due to the bandwidth constraint, $$t_f \geq D_n \tag{12}$$

This is also the condition of stability for the D/G/1 queue.

Let M denote the number of active (off-the-hook) voice sources. Consider again the case where $\tau_s = 0$. Assuming all queues are non-empty, a train is of length $M(T_v + t_d) + \tau + \tau_c + 2t_d$. The service time distribution of a packet can be bounded by a deterministic one, with the service time equal to a maximum train length. Consider all queues to be (pessimistically) represented by D/D/1, where the interarrival time is $t_f$ and the service time is $D_n = M(T_v = t_d) + \tau + \tau_c + 2t_d$. With these considerations, provided that the queue size is initially 0 and $t_f \geq D_n$, the waiting time of a packet is 0 and its total delay is $D_n$. The delay constraint for a voice bit is now written as $$t_f + D_n \leq D_v \tag{13}$$

The above two constraints lead to a maximum value for M when $t_f = D_n = D_v/2$ is chosen. Accordingly, the optimum packet size is given by $$B_v^{(2)} = \frac{D_v W_v}{2} \tag{14}$$

and the maximum number of voice users allowed at any one time is given by $$M_{max} = \frac{D_v/2 - (\tau + \tau_c + 2t_d)}{B_v/W + t_d} \tag{15}$$

Neglecting $\tau + \tau_c + 2t_d$, in comparison to $D_v$, and $t_d$ in comparison to $T_v$, $$M_{max} = \frac{D_v W}{2B_v} = \frac{D_v W}{2B_v^{(1)} + D_v W_v} \tag{16}$$

Note that as long as $M \leq M_{max}$, it is guaranteed that the length of a train never exceeds $M_{max}$ transmission units, and the network packet service time never exceeds the maximum determined above: $M_{max}(T_v + t_d) + \tau + \tau_c + 2t_d$, consequently no queuing delay is incurred, the queue size at all users remains $\leq 1$, and the total delay constraint for all voice bits is always satisfied.

The principal constraints to be satisfied here are the delay constraint on voice packets and a minimum bandwidth requirement for data. Although a delay constraint need not be imposed on data packets, it is important to provide the bandwidth "reserved" for data on as continuous a basis as possible, and to fairly allocate that bandwidth to data users. Furthermore, the protocols are required to be dynamic in allocating the bandwidth to voice and data applications, allowing data users (or background traffic) to gracefully steal the bandwidth which is unused by voice. To accomplish these objectives on the network, consider two types of trains, the voice train type (VT) and the data train type (DT). Trains are always alternating between the two types, and stations transmit their packets on the train of the corresponding type. To satisfy the delay constraint for voice packets, it is important not only to limit the number of voice communications to a maximum, but also to limit the data trains to a certain maximum length. Let $W_d$ be the minimum data bandwidth required. Assuming that data trains are limited to a maximum length L, their effect on the calculation of the optimum value of M is to just increase the overhead between consecutive trains by the amount $L + \tau + \tau_c + 2t_d$. The maximum M is then given by $$M_{max} = \frac{D_v/2 - 2(\tau + \tau_c + 2t_d) - L}{B_v/W + t_d} \tag{17}$$

L is easily determined in function of $W_d$ and the data packet length characteristics. Assume, for analysis purposes, for example, that data packets are of fixed length, $B_d = B_d^{(1)} + B_d^{(2)}$ bits/packet, where $B_d^{(1)}$ accounts for packet overhead and $B_d^{(2)}$ for information bits. (Although the data packets can be of variable lengths.) Let N denote the maximum number of data packets in a data train. In order to achieve $W_d$, N is given by $$N = \frac{W_d D_v}{2 B_d^{(2)}} \tag{18}$$

Consequently L is given by $$L = N \left[ \frac{B_d}{W} + t_d \right] \tag{19}$$

Neglecting $t_d$, $\tau$ and $\tau_c$ $$N = \frac{W_d D_v B_d}{2W B_d^{(2)}} \tag{20}$$

and $$M_{max} = \frac{D_v(W - W_d B_d/B_d^{(2)})}{2B_v^{(1)} + D_v W_v} \tag{21}$$

It is important to limit data trains to the maximum length L at all times, even if the number of active voice users is smaller than $M_{max}$. Otherwise, situations may arise where the packet delay for a voice packet will exceed $D_v$. This particularly takes place if, during a data train, a number of new voice users become ready, some of which might incur an initial delay longer than the maximum allowed.

Since a data train may not contain the TU's of all ready stations, it is important that the next data round resumes where the previous data train has ended. This is easily accomplished by the inclusion of the DORMANT/ACTIVE states for data users in the same way as in the RR algorithm. To switch from the DORMANT to the ACTIVE state, data users have to monitor the length of data trains on the inbound channel: a dormant user switches to the ACTIVE state whenever the length of a data train has not reached its maximum limit L.

In order to alternate between the two types of trains, a station maintains a flag $\phi$ which gets complemented at each occurrence of EOT(IN). Assume the convention $\phi=0$ for a data train and $\phi=1$ for a voice train. Now the problem is faced of having a station properly initialize $\phi$ when it becomes ALIVE. The simplest way is as follows. If the network is found DEAD, then, following the pilot, the station initializes $\phi$ such that the first train is of the voice type. If the network is found Alive, then the station monitors the inbound channel until either a valid packet is observed or the network has gone dead. In the former case, the type of train is derived from the type of packet observed, and $\phi$ is initialized accordingly. In the second case, the station undertakes a cold-start and the initialization of $\phi$ is independent of past history. Note that as long as the network is determined ALIVE, a station may not become ALIVE until it has observed a valid packet transmission; all empty trains are ignored. If it is highly likely that long successions of empty trains occur, the above mechanism may induce a high initial delay before the station becomes ALIVE. This can be overcome by including explicit information in the LOCOMOTIVE which indicates the type of train. That is, the LOCOMOTIVE becomes now a train-type indicator (TI) packet. The proper indicator packet must be transmitted following EOT(IN) (i.e., an attempt to do so is undertaken) by all ALIVE stations in the network, regardless of the type of packets they intend to transmit. Clearly only one transmission of the train-type indicator packet is accomplished, by the station in the ALIVE state with the lowest index. With this mechanism, a station wishing to become ALIVE in a network determined ALIVE waits for BOT(IN) following which it receives and decodes the train-type indicator packet, and initializes the flag accordingly. The use of the train-type indicator packet increases the overhead caused by the LOCOMOTIVE from $t_d$ to the transmission time of a (relatively short) TI packet. This extra overhead has a small impact on the performance which is still approximated by the equations given previously.

Another alternative to provide information regarding the train type is to have the locomotive consist of a specified pattern of bursts of unmodulated carrier and silences, one pattern for each type of train. Stations alternate between the two types of locomotives, keeping in synchronization with the network. In this approach, it is possible to consider the patterns to be in such a way that, in case of disagreement, the train indicator will result of the voice type.

It has been indicated previously that in order to satisfy the delay constraint for voice packets it is necessary to limit the number of phone calls in progress at the same time. This requires that a mechanism exists to check whether a new phone call can be accepted or not. The decision is based on the number of calls already set up, and this can be obtained by simply measuring the length of the previous voice-train. However, if voice packets representing silence are not transmitted, this measure may not be accurate and one may have to collect data regarding the length of several voice trains before deciding on the acceptance of a new call. The savings on voice bandwidth obtained by silence suppression may be utilized to increase the average data bandwidth. If used to increase the maximum number of phone calls on the network, then a service degradation will have to be allowed as some packets may be delayed beyond the maximum delay $D_v$.

In the above discussion, it was assumed that the integration of different types of traffic is obtained by using different types of trains and by requiring that a packet be transmitted only on a train of the corresponding type. Another possible approach is to allow mixing of the different types of packets (whether data and/or voice) on the same train. In this case there is no need to provide train indicators. However, each station is then required to measure not only the length of the current train but also the period of time in the train already utilized by each type of traffic so that the bandwidth utilized by each traffic does not exceed the maximum value allowed. In order to fulfill the delay requirements for voice traffic it can be seen that the global amount of data transmitted in a train has to be limited to L/2. Note however that this limitation does not affect the overall efficiency of the system nor the bandwidth assigned to each type of traffic.

J. The Voice/Data Network Algorithm

Although the algorithm presented here is for only two types of trains, the concepts can be applied to any larger number of types, regardless of the applications intended. Let STATE ($\phi$) denote the DORMANT/ACTIVE state of a station with respect to train type $\phi$, and TB(t,$\phi$) denote the state of its buffer (empty or nonempty) with respect to packet type. We let L($\phi$) denote the maximum allowable length of a train of type $\phi$, including the transmission of the train indicator, and $R(\phi)=L(\phi)+\tau+\tau_c+t_d$. Let C denote a clock which is used to measure the length of a train in progress. In the following presentation, Steps 1 through 4 are performed by a station wishing to become ALIVE and to initialize its parameter $\phi$, while the remaining steps are executed by a station which is ALIVE. Initially STATE ($\phi$)=ACTIVE, $\phi=0$, 1.

Step 1.

If TRAIN (t,IN)=0 then go to Step 2, otherwise wait for EOT(IN) at which time proceed with Step 2.

Step 2.

[Determine whether the network is ALIVE or not.] Wait for the first of the following two events: BOT(IN) and TIME-OUT($\tau+\tau_c+t_d$). If BOT(IN) occurs first then go to Step 3; otherwise, go to Step 4. (In case of a tie, BOT(IN) is considered to have precedence.

Step 3.

Set $C=\tau+\tau_c+t_d$. Receive and decode train-type indicator. If the decoding is unsuccessful then go to Step 1; otherwise, initialize $\phi$ accordingly, and go to Step 5. (It is assumed here that the operation of decoding a train-type indicator can be completed before EOT(IN) is detected, even when the current train contains only the train indicator. This is easily accomplished in practice by maintaining carrier on beyond the end of transmission of train indicator for a period of time sufficiently long so as to guarantee completion of the decoding operation before the occurrence of EOT(IN).)

Step 4.

[The network is DEAD: execute the cold-start procedure.] Initiate transmission of PILOT. Wait for BOT(IN). At the occurrence of BOT(IN), stop transmission of PILOT, set $\phi=0$, C=0, and proceed with Step 5.

Step 5.

Wait for the first of the following two events: EOT(N) and EOC(OUT). If EOC(OUT) occurs first, then go to Step 9; otherwise proceed with Step 6.

Step 6.

[At occurrence of EOT(IN), C contains a measure of the length of the previous train. This information is passed on to higher levels to determine acceptance or rejection of new voice calls.] Notify higher levels of the current values of $\phi$ and C.

Step 7.

[Reset STATE ($\phi$) if appropriate.] If C<R($\phi$) then set STATE ($\phi$)=ACTIVE.

Step 8.

[A new train is to be started.] Complement $\phi$; set C=0; and transmit train indicator. (In the case where the train indicator is an actual packet, its transmission is in accordance with the basic transmission as follows: Initiate transmission of TI and wait $t_d$ seconds. If at this new point in time c(t,OUT)=1 then abort transmission of TI and go to Step 5; otherwise, wait for CTX and then proceed with Step 9.)

Step 9.

If STATE ($\phi$)=ACTIVE and TB(t,$\phi$)=1 and C<L($\phi$), then go to Step 10; otherwise, go to Step 5.

Step 10.

Initiate transmission of TU. Wait $t_d$ seconds. If at this new point of time c(t,OUT)=0 and C<L($\phi$) then proceed with Step 11; otherwise, abort transmission of TU and go to Step 5.

Step 11.

Wait for the first of the following two events: CTX and C=L($\phi$). If C=L($\phi$) occurs first, then abort transmission of TU and go to Step 5; otherwise, set STATE ($\phi$)=DORMANT and go to Step 5.

Note that in the above algorithm, in order to keep STATE (1)=ALIVE for all stations at all times, it is sufficient to assign to L(1) an arbitrarily large number. The flow chart for the VOICE/DATA network algorithm is shown in FIGS. 8 and 9. FIG. 8 represents Steps 1 through 4 performed by a DEAD station in becoming ALIVE, while FIG. 9 represents the steps executed by a station which is ALIVE. In case the train indicator is an actual packet, the box labeled TRANSMIT TRAIN INDICATOR must contain all instructions outlined in Step 8 above. The state diagram for a finite state machine which performs the above algorithm is shown in FIGS. 10 and 11. FIG. 10 contains the portion of the state diagram corresponding to the flow chart in FIG. 8, while FIG. 11 contains the portion of the state diagram corresponding to the flow chart in FIG. 9.

K. Embodiment of the Invention With Bidirectional Transmitters

In this section, several alternatives are discussed for achieving the upstream carrier sensing capability when signal propagation of the outbound channel is bidirectional. One possible way is to insert a directional coupler 33 on the upstream side of the transmitting tap 33 (see FIG. 2F. A directional coupler can be implemented by utilizing transformers. Another implementation is depicted in FIG. 2G. Two (passive) receiving taps 31,33, such as T-connectors, are connected to the bus 21 so that the propagation delay 37 from one tap to the other is a specified value $\tau_d$. Referring to FIG. 2G, the signal received in tap A is subtracted after a delay $\tau_d$ from the signal received on tap B to obtain an output o(t). Accordingly, any signal flowing on the bus in the A to B direction gives an output o(t)=0 at C, while a signal s(t) flowing in the B to A direction gives $$o(t)=s(t)-s(t-2\tau_d).$$

If one chooses $$\tau_d = \frac{1}{4f_c}(2n + 1)$$

where $f_c$ is the carrier frequency and n any integer number, carrier detection of s(t) can be obtained by carrier detection of o(t). An appealing feature of this alternative is that the transmitting tap can coincide with tap A of FIG. 2G which becomes a receiving and transmitting tap.

FIG. 12 depicts a block diagram of one station 50, the transmission portion of which is connected to unidirectional communication or broadcast bus 21 through passive tap 23. The receiver portion of station 50 is connected to unidirectional communication or broadcast bus 20 through passive tap 30.

Station 50 typically includes transmitter logic 52 connected to tap 40 through bus 44 and 42. Transmitter logic 52 receives information from a using device through an output buffer.

The receiver portion of station 50 is connected to tap 30 through bus 32 to receiver logic 62, which in turn is connected to a using device through an input buffer. Transmission and receiving functions are performed by circuit 27, the functions of which have been described in conjunction with the description of FIGS. 2A–2G.

Referring now to FIG. 12, a more detailed diagram of a station such as station 50 of FIG. 11 is depicted.

In FIG. 12, a using device 60 is connected to an output buffer 136 which in turn is connected to a transmitter shift register 134. The serial data from register 134 is clocked by transmitter clock circuit 132 to phase decoder 130 under control of transmitter control circuit 100. Phase encoder 130 is connected to passive tap 40 through bus 44 for connecting the serialized packet data to the outbound channel 21 of unidirectional broadcast bus 20.

For receiving packet data on the outbound channel of unidirectional communication or broadcast bus 20, the packet data is connected through passive tap 30 onto bus 32 for connection to phase decoder circuit 104 from which the data is input to receiver shift register 110.

The received data from register 110 is connected to input buffer 114 for appropriate input to a using device 60.

Address filter 112 provides suitable addressing of address register 116. A carrier detector circuit 102 connected to the inbound channel portion of broadcast bus 20 detects or senses a carrier on bus 20.

Similarly, the carrier on the outbound channel portion of broadcast bus 20 is sensed by CD104 and connected to transmitter control circuit 100.

In summary, an improved local area communication network for one embodiment based on a unidirectional broadcast system architecture has been described. The Network Access Protocol used by all stations connected to the bus is a distributed algorithm which provides conflict-free transmission of messages. It is essentially a round-robin scheme in which the time to switch from one active user to the next in a round is kept very small, on the order of carrier detection time, thus achieving a performance which is relatively independent of the end-to-end network propagation delay. This feature represents a major improvement obtained with this protocol in comparison to other existing ones, such as CSMA-CD and round robin; it makes it very suitable for local area networks in which, bcause of high channel speed, long end-to-end delay and/or small packet size, the propagation delay constitutes a large fraction of or is even bigger than the packet transmission time. Furthermore, it has been shown that this protocol is particularly suitable for the transmission of packetized voice as it is able to guarantee an upper bound on the transmission delay for each packet. A possible way to integrate voice and data on the same network has been described in detail.

Although a preferred embodiment of an improved local area communication network has been described based upon a unidirectional communication format, the present invention is also applicable to cover other communication media such as bidirectional communication buses, fiber optics, broadband communication techniques, and the like. Also, the present invention is intended to cover general communication configurations which employ the basic transmission mechanism set for above, as, for example, a single communication bus used to collect data at a single point from a plurality of stations connected thereto. Accordingly, it is intended that the scope of the present invention cover any and all such variations without departing from the true spirit and scope of the invention as defined by the accompanying claims.

What is claimed is:

1. A local communication network comprising
   a communication bus for transmitting data packets including an inbound channel, an outbound channel, and means for connecting said inbound channel to outbound channel such that data packets are transmitted in the same direction on said inbound channel and said outbound channel,
   a plurality of stations S1-SN located along and connected to said communication bus where each of said stations have a respective index corresponding to the location of its connection to said bus such that carrier signals having data packets are transmitted from said stations on said outbound channel in a round robin format, each of said stations including for each round of said round robin format,
   transmit means for transmitting carrier signals having data packets on said outbound channel past each station connected to said outbound channel having a higher index than the respective transmit station,
   receive means connected to said inbound channel such that data packets are propagated past each of said receive means in the same order as the respective indices of said stations connected to said outbound channel thereby achieving said round robin format, and
   means for controlling the transmission and reception of said data packets, said control means including
   means for sensing a first carrier signal transmitted by one of said stations having a lower index on said outbound channel,
   means for detecting the end of said first carrier signal and means responsive thereto for transmitting a second carrier signal having a data packet on said outbound channel,
   means for aborting transmission of said second carrier signal if a third carrier signal is sensed within a predetermined period of time $t_d$ where $t_d$ is the time for a station to detect the presence or absence of a carrier signal on said bus.

2. A network as in claim 1 wherein said communication bus is unidirectional.

3. A network as in claim 1 wherein said communication bus is bidirectional.

4. A network as in claim 1 further including means for connecting said inbound channel to said outbound channel thereby permitting transmission of said outbound data packets on said inbound channel.

5. A network as in claim 4 wherein said inbound channel is parallel to said outbound channel.

6. A network as in claim 4 wherein the propagation delay from said transmitting and receiving means is substantially the same for all of said stations.

7. A network as in claim 4 wherein the propagation delay between any two stations on said inbound channel is substantially the same as for the respective two stations on said outbound channel.

8. A network as in claim 4 wherein said data packets include a transmission unit comprising a preamble followed by an information packet and wherein each of said stations include a transmitting tap on said outbound channel.

9. A network as in claim 8 further including means for receiving signals on said outbound channel.

10. A network as in claim 9 wherein each of said stations include a receiving tap on said inbound channel.

11. A network as in claim 4 further including means for sensing a carrier signal on said outbound channel.

12. A network as in claim 11 further including means for sensing carrier flowing in a certain direction on said outbound channel.

13. A network as in claim 12 including means for detecting a carrier signal on the upstream portion of said transmitting means.

14. A network as in claim 10 wherein each of said stations include means connected to said inbound channel for sensing a carrier signal.

15. A network as in claim 10 wherein each of said stations include means for receiving specified ones of said transmission units.

16. A network as in claim 13 wherein each of said stations include means responsive to the detection of an end of carrier signal on said outbound channel for starting transmission of one of said transmission units on said communication bus.

17. A network as in claim 16 wherein each of said stations include a receiving tap on said inbound channel and means for sensing a carrier signal on said inbound channel.

18. A network as in claim 17 wherein a succession of transmission units comprise a train and wherein each of said stations include means for sensing an end of train on said inbound channel, means responsive to said end of train for initiating transmission of a transmission unit and for simultaneously sensing for a carrier signal on said outbound channel.

19. A network as in claim 18 wherein each of said stations include means for detecting the end of one of said trains on said inbound channel, means responsive to the detection of said end of train for generating a carrier having a predetermined duration, and means for initiating transmission of a respective transmission unit following said carrier.

20. A network as in claim 16 wherein each of said stations include means for sensing carrier on said outbound channel after starting transmission of said respective transmission unit, and means for aborting transmission of said respective transmission unit if carrier is sensed on said outbound channel while transmitting.

21. A network as in claim 16 further including means for completing transmission of said transmission unit if said outbound channel is sensed as idle within a predetermined time period.

22. A network as in claim 14 wherein each of said stations include means for detecting a carrier signal on said inbound channel for a predetermined time period, means for transmitting continuously a pilot carrier signal if no carrier is detected, means for detecting the beginning of a carrier signal on said inbound channel and means responsive to the detection of said beginning of said carrier signal for terminating transmission of said pilot signal.

23. A network as in claim 20 wherein said data packets are of different type and further including means for integrating said different types of packets on said communication bus.

24. A network as in claim 23 wherein said means for integrating include means for recognizing the different types of packets on said bus.

25. A network as in claim 23 further including means for distinguishing trains of different types on said communication bus.

26. A network as in claim 25 further including means for specifying the train type indicator.

27. A network as in claim 25 further including means for recognizing the train type.

28. A network as in claim 27 including means for transmitting a particular packet on a corresponding train of the same type.

29. A network as in claim 27 wherein each of said stations include means for determining the state of the respective station for representing the type of train in progress.

30. A network as in claim 29 including means for storing information representing the previous types of trains transmitted.

31. A network as in claim 29 including means for updating the state of said station.

32. A network as in claim 31 where said means for updating are responsive to an end of train on said communication bus.

33. A network as in claim 31 where said means for updating are responsive to end of packet transmission on said communication bus.

34. A network as in claim 20 including means for controlling the length of the train on said communication bus.

35. A network as in claim 34 including means for measuring the current train length in progress on said communication bus.

36. A network as in claim 35 including means for measuring a train in progress on said inbound channel.

37. A network as in claim 34 including means for measuring the length of a train in progress on said outbound channel.

38. A network as in claim 29 including means for aborting transmission of transmission unit when a certain maximum train length is reached.

39. A network as in claim 35 including means for starting transmission of a transmission unit if the measured train length including packet information does not exceed said maximum length.

40. A network as in claim 35 including means for completing transmission of a transmission unit as long as said maximum train length is not reached.

41. A network as in claim 23 wherein each station includes at least a first state permitting transmission of a transmission unit and a second state prohibiting transmission of a transmission unit and including means responsive to said first state for permitting transmission of a transmission unit and means responsive to said second state for prohibiting transmission of a transmission unit.

42. A network as in claim 23 wherein each station includes one or more states for controlling transmission and reception of said transmission unit.

43. A network as in claim 41 including means for updating said station states.

44. A network as in claim 42 including means responsive to an end of transmission unit transmission for updating said station state.

45. A network as in claim 42 including means responsive to an end of train transmission for updating said station state.

46. A local area communication network comprising a communication bus including an inbound channel and an outbound channel, and means for connecting said inbound channel to said outbound channel such that carrier signals having data packets are transmitted in the same direction on said inbound channel and said outbound channel in a round robin format, a plurality of stations S1-SN located along and connected to said communication bus where each of said stations have a respective index corresponding to the location of its connection to said bus, each of said stations including a transmitting tap connected to said outbound channel for transmitting data packets, means for sensing a carrier signal flowing in a certain direction on said outbound channel, means for detecting an end of said carrier signal with a certain time period, and means responsive to said end of carrier for starting transmission of one of said data packets thereby achieving a round robin format.

47. A network as in claim 46 further including means for aborting transmission of said data packets if carrier is sensed on said outbound channel.

48. A network as in claim 46 including means for completing transmission of said data packets if said outbound channel is sensed as idle within a certain time period.

49. A local area communication network comprising a communication bus having an inbound channel and an outbound channel, a plurality of stations S1-SN located along and connected to said bus where each of said stations have a respective index corresponding to the locations of its connection to said bus, each of said stations including means for transmitting and receiving carrier signals having data packets on said bus in a round robin format such that said data packets are propagated past each of said stations in the same direction on said outbound channel to said inbound channel thereby achieving said round robin format, means for sensing a first carrier signal transmitted by one of said stations having a lower index on said outbound channel, and means responsive to the detection of an end of carrier signal on said outbound channel for starting transmission of one of said transmission units on said outbound channel.

50. A network as in claim 49 further including means for aborting transmission of said transmission unit if carrier is sensed on said outbound channel while transmitting.

51. A network as in claim 49 wherein said each of said stations further include means for completing transmission of said transmission unit if said outbound channel is sensed as idle within a predetermined time period.

52. A network as in claim 49 wherein each of said stations includes means for detecting carrier on said outbound channel for a certain time period, means for transmitting a pilot signal if no carrier signal is detected, means for detecting the beginning of carrier on said inbound channel and means responsive to the detection of said beginning of carrier signal for terminating transmission of said pilot signal.

53. A local area communication network comprising a communication bus having an inbound channel and an outbound channel, a plurality of stations S1-SN located along and connected to said communication bus where each of said stations have a respective index corresponding to the location of its connection to said bus, each of said stations including means for transmitting and receiving carrier signals having information data packets on said communication bus in a round robin format wherein said data packets are of a different type, means for integrating said different types of packets on said communication bus such that the data packets are propagated on said inbound channel in the same direction with respect to each of said stations as on said outbound channel thereby achieving a round robin format, and means for controlling the transmission and reception of said data packets, said control means including means for sensing a first carrier signal transmitted by one of said stations having a lower index on said outbound channel, means for detecting the end of said first carrier signal and means responsive thereto for transmitting a second carrier signal having a data packet on said outbound channel, and means for aborting transmission of said second carrier signal if a third carrier signal is sensed within a predetermined period of time $t_d$ where $t_d$ is the time for a station to detect the presence or absence of a carrier signal on said bus.

54. A local area communication network comprising a communication bus having an inbound channel and an outbound channel, a plurality of stations S1-SN located along and connected to said communication bus where each of said stations have a respective index corresponding to the location of its connected to said bus, each of said stations including a transmitting tap on said outbound channel and means for transmitting and receiving carrier signals having information data packets on said communication bus in a round robin format such that said data packets are propagated past each of said stations on said inbound channel in the same direction with respect to said stations on said outbound channel thereby achieving said round robin format, means for controlling the transmission and reception of said data packets, said control means including means for sensing a first carrier signal transmitted by one of said stations having a lower index on said outbound channel, means for detecting the end of said first carrier signal and means responsive thereto for transmitting a second carrier signal having a data packet on said outbound channel, and means for aborting transmission of said second carrier signal if a third carrier signal is sensed within a predetermined period of time $t_d$ where $t_d$ is the time for a station to detect the presence or absence of a carrier signal on said bus.

55. A network as in claim 54 wherein each of said stations includes means for sensing carrier on the upstream side of said transmitting tap.

56. A network as in claim 54 wherein each of stations include means for forcing undirectionality on said communication bus with respect to said connected stations.

57. A network as in claim 56 wherein such stations include means for sensing carrier on the upstream side of the first of said enforcing means.

58. A network as in claim 56 wherein each of said stations includes means for sensing carrier on said bus other than the respective transmission by said station, and means for subtracting the transmitted signal of said respective station.

59. A network as in claim 55 wherein each of said stations includes at least two taps on said communication bus separated by a predetermined distance for forcing undirectionality on said communication bus.

60. A network as in claim 59 wherein said enforcing means includes delay means for delaying said data packets and means for negating the delayed transmitted signal.

61. A network as in claim 60 wherein each of said stations includes means for sensing a carrier signal upstream with respect to the transmission direction.

62. A network as in claim 54 including directional coupler means for coupling said data packets to said communication bus.

63. A network as in claim 54 wherein said communication bus is bidirectional and wherein each of said stations includes means for sensing carrier on said communication bus.

64. A local area communication network comprising a communication bus having an outbound channel, a plurality of stations S1-SN located along and connected to said communication bus where each of said stations have a respective index corresponding to the location of its connection to said bus, each of said stations including a transmitting tap connected to said outbound channel, transmit means for transmitting carrier signals having data packets in a round robin format on said outbound channel past each station connected to said outbound channel having a higher index than the respective transmit station, means for sensing a carrier signal on the upstream side of said transmitting tap, means for detecting the end of said first carrier signal and means responsive thereto for transmitting a second carrier signal having a data packet on said outbound channel, and means for aborting transmission of said second carrier signal is sensed within a predetermined period of time $t_d$ where $t_d$ is the time for a station to detect the presence or absence of a carrier signal on said bus, thereby achieving said round robin format.

65. A local area communication network comprising a communication bus, a plurality of stations S1-SN located along and connected to said communication bus where each of said stations have a respective index corresponding to the location of its connection to said bus such that said carrier signals having data packets are transmitted from said stations on said communication bus in a round robin format, each of said stations including, for each round of said round robin format, transmit means for transmitting carrier signals having data packets on said communication bus past each station connected to said communication bus having a higher index than the respective transmit station, receive means connected to said communication channel such that data packets are propagated past each of said receive means in the same order as the respective indices of said stations connected to said communication bus thereby achieving said round robin format, means for controlling the transmission and reception of said data packets, said control means including means for sensing a first carrier signal transmitted in a certain direction by one of said stations having a lower index on said communication bus, and means for detecting the end of said first carrier signal and means responsive thereto for transmitting a second carrier signal having a data packet on said communication bus.

66. A local area communication network as in claim 65 wherein said control means includes means for aborting transmission of said second carrier signal if a third carrier signal is sensed within a predetermined period of time $t_d$ where $t_d$ is the time for a station to detect the presence or absence of a carrier signal on said bus.

* * * * *